(12) United States Patent
Waldron, III et al.

(10) Patent No.: US 8,527,412 B1
(45) Date of Patent: Sep. 3, 2013

(54) END-TO END MONITORING OF A CHECK IMAGE SEND PROCESS

(75) Inventors: Willard H. Waldron, III, Charlotte, NC (US); Geoffrey R. Williams, Midlothian, TX (US)

(73) Assignee: Bank of America Corporation, Charlotte, NC (US)

( * ) Notice: Subject to any disclaimer, the term of this patent is extended or adjusted under 35 U.S.C. 154(b) by 571 days.

(21) Appl. No.: 12/200,165

(22) Filed: Aug. 28, 2008

(51) Int. Cl.
*G06Q 40/00* (2012.01)

(52) U.S. Cl.
USPC .................. 705/40; 705/35; 705/45; 345/629

(58) Field of Classification Search
USPC .......................................................... 705/45
See application file for complete search history.

(56) References Cited

U.S. PATENT DOCUMENTS

| | | | | |
|---|---|---|---|---|
| 3,555,349 A | * | 1/1971 | Munz ............................. | 315/383 |
| 3,555,988 A | * | 1/1971 | Wagner ......................... | 396/585 |
| 3,556,050 A | * | 1/1971 | Trachtenberg et al. ....... | 399/240 |
| 3,558,810 A | * | 1/1971 | Cecchin et al. ............... | 348/641 |
| 3,560,739 A | * | 2/1971 | Wolff ............................ | 250/306 |
| 3,561,432 A | * | 2/1971 | Yamaki et al. ................ | 600/167 |
| 3,564,133 A | * | 2/1971 | Hobrough ..................... | 250/558 |
| 3,564,266 A | * | 2/1971 | Klotz, Jr. ........................ | 377/19 |
| 3,566,139 A | * | 2/1971 | Hardy et al. .................. | 250/558 |
| 3,567,856 A | * | 3/1971 | Nezu ............................. | 358/485 |
| 3,571,527 A | * | 3/1971 | Becker et al. ................. | 360/17 |
| 3,572,924 A | * | 3/1971 | Matsumoto et al. ........... | 355/27 |
| 3,576,392 A | * | 4/1971 | Hofstein ....................... | 348/331 |
| 3,576,999 A | * | 5/1971 | Blythe et al. ................. | 701/514 |
| 3,578,857 A | * | 5/1971 | Busch ............................. | 353/94 |
| 3,584,148 A | * | 6/1971 | Flory ............................. | 348/97 |
| 3,584,931 A | * | 6/1971 | Doring .......................... | 359/407 |
| 3,585,283 A | * | 6/1971 | Graser, Jr. ..................... | 348/764 |
| 3,586,765 A | * | 6/1971 | Jirka ............................. | 348/644 |
| 3,592,535 A | * | 7/1971 | Gerry ............................. | 352/31 |
| 3,592,548 A | * | 7/1971 | Majkowski .................... | 356/71 |
| 3,614,309 A | * | 10/1971 | Presti ............................. | 386/201 |
| 3,614,764 A | * | 10/1971 | Kolb et al. ..................... | 345/13 |
| 3,615,540 A | * | 10/1971 | Land et al. .................... | 430/208 |
| 3,619,052 A | * | 11/1971 | Diachuk et al. ................ | 355/45 |
| 3,619,060 A | * | 11/1971 | Johnson ......................... | 356/71 |
| 3,620,729 A | * | 11/1971 | Ray-Chaudhuri et al. ...... | 430/84 |
| 3,622,224 A | * | 11/1971 | Wysocki et al. ............... | 349/83 |
| 3,627,918 A | * | 12/1971 | Redpath ......................... | 348/47 |

(Continued)

OTHER PUBLICATIONS

Kwak et al., "Benefits, obstacles, and future of six sigma approach", Technovation, vol. 26, pp. 708-715, 2006.

*Primary Examiner* — Chika Ojiaku

(74) *Attorney, Agent, or Firm* — Michael A. Springs; Moore & Van Allen PLLC; Jeffrey R. Gray

(57) ABSTRACT

A method, system, computer program product, or a combination of the foregoing and apparatus for an end-to-end Business Activity Monitoring (BAM) solution for an image send process. Specifically, monitoring metrics related to an image send process for cash letters or other negotiable items from the time that the items are received by the receiving financial institution until the time that the image cash letter is sent to the send partners and ultimately, the paying financial institution. An end-to-end monitoring solution provides real time insight into the health of a process, allowing the financial institution to address issues in advance of customer impact, both within and outside of the financial institution, and facilitate the identification of ongoing improvement opportunities as the process continues to grow and adapt.

29 Claims, 12 Drawing Sheets

(56) References Cited

U.S. PATENT DOCUMENTS

| | | | |
|---|---|---|---|
| 3,630,623 A * | 12/1971 | Schirmer | 356/155 |
| 3,632,181 A * | 1/1972 | Lee | 359/26 |
| 3,635,139 A * | 1/1972 | Guite, Sr. | 396/364 |
| 3,636,845 A * | 1/1972 | Harvey | 430/210 |
| 3,643,017 A * | 2/1972 | Pekau | 348/40 |
| 3,643,019 A * | 2/1972 | Beltz | 358/426.12 |
| 3,646,256 A * | 2/1972 | Jacob et al. | 358/438 |
| 3,647,289 A * | 3/1972 | Weber | 359/12 |
| 3,647,290 A * | 3/1972 | Egnaczak et al. | 399/131 |
| 3,647,441 A * | 3/1972 | Bachelder | 430/403 |
| 3,648,388 A * | 3/1972 | Lowell et al. | 434/324 |
| 3,648,584 A * | 3/1972 | Eacock | 396/32 |
| 3,652,164 A * | 3/1972 | Faramarzpour et al. | 356/125 |
| 3,654,707 A * | 4/1972 | Roberts | 434/315 |
| 3,656,427 A * | 4/1972 | Foley | 101/93.29 |
| 3,659,159 A * | 4/1972 | Nagata | 345/3.1 |
| 3,661,457 A * | 5/1972 | Frech | 355/78 |
| 3,661,577 A * | 5/1972 | Klemm et al. | 430/22 |
| 5,600,574 A * | 2/1997 | Reitan | 702/185 |
| 5,774,249 A * | 6/1998 | Shiraishi et al. | 359/205.1 |
| 6,913,260 B2 * | 7/2005 | Maier et al. | 271/265.04 |
| 7,082,216 B2 * | 7/2006 | Jones et al. | 382/137 |
| 7,092,560 B2 * | 8/2006 | Jones et al. | 382/135 |
| 7,103,438 B2 * | 9/2006 | Hallowell et al. | 700/116 |
| 7,171,032 B2 * | 1/2007 | Jones et al. | 382/135 |
| 7,191,657 B2 * | 3/2007 | Maier et al. | 73/587 |
| 7,197,173 B2 * | 3/2007 | Jones et al. | 382/135 |
| 7,201,320 B2 * | 4/2007 | Csulits et al. | 235/462.01 |
| 7,232,024 B2 * | 6/2007 | Mazur et al. | 194/207 |
| 7,362,891 B2 * | 4/2008 | Jones et al. | 382/135 |
| 7,366,338 B2 * | 4/2008 | Jones et al. | 382/135 |
| 7,391,897 B2 * | 6/2008 | Jones et al. | 382/135 |
| 7,503,445 B2 * | 3/2009 | Yoshioka | 194/350 |
| 7,505,831 B2 * | 3/2009 | Jones et al. | 700/224 |
| 7,542,598 B2 * | 6/2009 | Jones et al. | 382/135 |
| 7,590,274 B2 * | 9/2009 | Raterman et al. | 382/135 |
| 7,591,428 B2 * | 9/2009 | Freeman et al. | 235/449 |
| 7,599,543 B2 * | 10/2009 | Jones et al. | 382/137 |
| 7,602,956 B2 * | 10/2009 | Jones et al. | 382/135 |
| 7,619,721 B2 * | 11/2009 | Jones et al. | 356/71 |
| 7,620,231 B2 * | 11/2009 | Jones et al. | 382/137 |
| 7,628,326 B2 * | 12/2009 | Freeman et al. | 235/449 |
| 7,635,082 B2 * | 12/2009 | Jones | 235/379 |
| 7,686,151 B2 * | 3/2010 | Renz et al. | 194/206 |
| 7,735,621 B2 * | 6/2010 | Hallowell et al. | 194/206 |
| 7,762,380 B2 * | 7/2010 | Freeman et al. | 194/210 |
| 7,778,456 B2 * | 8/2010 | Jones et al. | 382/135 |
| 7,779,982 B2 * | 8/2010 | Fitzgerald et al. | 194/206 |
| 7,789,243 B2 * | 9/2010 | Hornung et al. | 209/534 |
| 7,817,842 B2 * | 10/2010 | Mennie | 382/137 |
| 7,849,994 B2 * | 12/2010 | Klein et al. | 194/206 |
| 7,873,576 B2 * | 1/2011 | Jones et al. | 705/43 |
| 7,881,519 B2 * | 2/2011 | Jones et al. | 382/135 |
| 7,882,000 B2 * | 2/2011 | Jones | 705/35 |
| 7,903,863 B2 * | 3/2011 | Jones et al. | 382/135 |
| 7,929,749 B1 * | 4/2011 | Jones et al. | 382/135 |
| 7,938,245 B2 * | 5/2011 | Jenrick et al. | 194/206 |
| 7,946,406 B2 * | 5/2011 | Blake et al. | 194/200 |
| 7,950,656 B2 * | 5/2011 | Adams | 271/262 |
| 7,978,899 B2 * | 7/2011 | Jenrick et al. | 382/135 |
| 8,041,098 B2 * | 10/2011 | Jones et al. | 382/137 |
| 8,103,084 B2 * | 1/2012 | Jones et al. | 382/140 |
| 8,125,624 B2 * | 2/2012 | Jones et al. | 356/71 |
| 8,126,793 B2 * | 2/2012 | Jones | 705/35 |
| 8,162,125 B1 * | 4/2012 | Csulits et al. | 194/206 |
| 8,169,602 B2 * | 5/2012 | Jones et al. | 356/71 |
| 8,204,293 B2 * | 6/2012 | Csulits et al. | 382/135 |
| 8,265,346 B2 * | 9/2012 | Blair | 382/112 |
| 8,290,216 B1 * | 10/2012 | Blair | 382/112 |
| 8,297,428 B2 * | 10/2012 | Renz et al. | 194/206 |
| 8,322,505 B2 * | 12/2012 | Freeman et al. | 194/210 |
| 8,331,643 B2 * | 12/2012 | Yacoubian et al. | 382/135 |
| 8,339,589 B2 * | 12/2012 | Jones et al. | 356/71 |
| 2004/0218729 A1 * | 11/2004 | Xue et al. | 378/210 |
| 2005/0213805 A1 * | 9/2005 | Blake et al. | 382/137 |
| 2005/0244035 A1 * | 11/2005 | Klein et al. | 382/112 |
| 2006/0212502 A1 * | 9/2006 | Chatterjee | 708/300 |
| 2006/0248009 A1 * | 11/2006 | Hicks et al. | 705/40 |
| 2007/0288382 A1 * | 12/2007 | Narayanan et al. | 705/45 |
| 2008/0040249 A1 * | 2/2008 | Re et al. | 705/35 |
| 2008/0059962 A1 * | 3/2008 | Ito | 718/100 |
| 2011/0215034 A1 * | 9/2011 | Mennie et al. | 209/534 |
| 2012/0189186 A1 * | 7/2012 | Csulits et al. | 382/135 |

* cited by examiner

Figure 2: Process Map

PULL INVENTORY DASHBOARD

Command & Control - SEND - Microsoft Internet Explorer

File Edit View Favorites Tools Help

← Back ▸ → ▸ × ☒ ⌂ | 🔍 Search ⭐ Favorites 🎮 | ⊘ ▸ ⌲ ▸ 📄 ▸ 🗐 🗊 🐞

Address: http://www.Company.com [ITEM PROCESSING] → Go

COMMAND & CONTROL ▽ ☐ MANAGEMENT ☐ SEND ☐ RESEARCH

Updated: 6/30/08 18:12 All Times Display as Central Time

SEND

[ CAPTURE ] ⇒ [ CAPTURE INVENTORY ] ⇒ [ PULL ] ⇒ [ PULL INVENTORY ] ⇒ [ SWEEP ] ⇒ [ DISTRIBUTION ] ⇒ [ ACK ]

2111 — CAPTURE INVENTORY
2112 — PULL INVENTORY
2113 — SWEEP / DISTRIBUTION
2114 — (Updated timestamp)

PULL INVENTORY SUMMARY OF ALL SITES — 2110

| COUNT OF SITES | TOTAL NUMBER ENTRIES | TOTAL NUMBER OF ITEMS | TOTAL DOLLARS |
|---|---|---|---|
| XX | X,XXX | ○ X,XXX,XXX | ○ $X,XXX,XXX,XXX.XX |

2122  2123  2124  2126  2128

PULL INVENTORY EXCEPTION DETAIL — 2120

| SITES | TOTAL ENTRIES | AVG ITEMS PER ENTRY | TOTAL IE ITEMS | TOTAL IE DOLLARS |
|---|---|---|---|---|
| HOUSTON | X | X,XXX | ● XX,XXX | ● $XXX,XXX,XXX.XX |
| OKLAHOMA CITY | X | X,XXX | ● XX,XXX | ● $XX,XXX,XXX.XX |
| ULZ | XXX | XXX | ○ XXX | $XX,XXX,XXX.XX |

2121  2131  2132  2121  2121

1/23...20 »

2130

| ENTRY NUMBER | | | TOTAL IE ITEMS | TOTAL IE DOLLARS |
|---|---|---|---|---|
| ⊞ ○ ATLANTA | XX | X,XXX | ● X,XXX | ● $XX,XXX,XXX.XX |
| ⊞ ○ ST LOUIS | XX | X,XXX | ● XXX,XXX | ● $XXX,XXX,XXX.XX |
| ⊞ ○ VIRTUAL SITE | XXX | XX | ○ XX,XXX | ● $XXX,XXX,XXX.XX |
| ⊞ ○ SAN FRANCISCO | X | X,XXX | ● X,XXX | ● $XX,XXX,XXX.XX |

2133

Done — Trusted sites

*FIG. 7*

END-TO END MONITORING OF A CHECK IMAGE SEND PROCESS

FIELD

This invention relates generally to the field of process monitoring, and more particularly, embodiments of the invention related to systems, methods, and computer program products for monitoring an image sending process from beginning to end.

BACKGROUND

As known, checks are negotiable instruments drawn against deposited funds that order a bank to pay a specified amount of money to a specified person on demand. Check collection, or "check clearing," facilitates payment by moving checks from the banks where the checks are deposited ("Receiving Banks") to the banks on whose accounts the checks are drawn ("Paying Banks"), and then moving the payment in the opposite direction. This process credits accounts at the Receiving Bank and debits accounts at the Paying Bank. The Federal Reserve participates in check clearing through its nationwide facilities, but many checks are cleared by private sector arrangement.

The passing of the Check Clearing for the 21$^{st}$ Century Act ("Check 21") by Congress allowed recipients of paper checks to create a digital version of the paper check called an Image Replacement Document ("IRD"). Under Check 21, IRDs, officially named "Substitute Checks," became a legal substitute for original paper checks. The IRDs include front and back images of the original check, together with other data presented by the magnetic ink character recognition (MICR) line along the bottom of the IRD, where such other data typically includes the routing and transit numbers, the check-writer's account number, and/or the dollar amount of the check.

Businesses and banks can work strictly with IRDs, transfer paper copies to IRDs, or in some cases use paper copies of the IRDs when exchanging the files between member banks, savings and loans, credit unions, services, clearinghouses, and the Federal Reserve Bank ("FED"). Additionally, a process known as "remote deposit" allows customers to upload the digital images of checks to the depositing institution directly, in order to get their account instantly credited, such as through electronic deposit of checks through an Automated Teller Machine (ATM). Some banks don't have the ability to create or process digital images. In such cases, third-party companies offer image processing services to these banks. The advent of Check 21 has greatly reduced check processing costs for banks, while speeding up the fund transfers.

The system of sending check images relies on the timely distribution and accurate evaluation of images captured from paper or via file from partners through the electronic processing of electronic images of checks, image cash letters, or other negotiable item images. Cash letters are groups of checks or potentially other negotiable instruments packaged and sent by a bank to another bank, clearinghouse, or Federal Reserve office. A cash letter is accompanied by a list containing the dollar amount of each check in the cash letter, the total number of checks in the cash letter, and the total dollar amount of all the checks in the cash letter. The cash letter may also include instructions for transmitting the groups of checks or other negotiable instruments to other banks or businesses.

Unfortunately, there are gaps throughout the check image sending process whereby image files can reach a failure point and never make it through to the distribution application and subsequently, their final destination. Currently there is no end-to-end monitoring system of the send processing stream whereby quality degradation or late processing of files can be accounted for and acted upon prior to impacting float on these files. Therefore, under the current system, it is difficult to monitor the outgoing electronic files and their associated images for uncollected, failed or mishandled image files, including checks, cash letters, and credits, from the point of capture through to distribution to the send partners in order to properly identify problems, fix the problems, and process the file flow prior to the problem impacting the bank's customers. The need exists for a system that allows banks or other financial institutions to monitor image checks, cash letters, and associated credits captured by the receiving bank or other financial institution and then sent to the send partners, including other receiving banks, intermediary banks, the Federal Reserve, and paying banks, in order to safeguard the image send process and protect the customer experience.

BRIEF SUMMARY

Embodiments of the present invention address the above needs and/or achieve other advantages by providing a method, system, computer program product, or a combination of the foregoing and an apparatus for an end-to-end Business Activity Monitoring ("BAM") solution for an image send process. Specifically, monitoring the health of an image send process as it progresses from negotiable instruments first being captured through when the bank receives an acknowledgement that the image reached the Paying Bank and was accepted by the Paying Bank.

One embodiment of the invention is a system for monitoring an image send process. A customer deposits within a financial institution either electronically or by paper negotiable items, such as checks, which are reformatted and sorted into image files for distribution to send partners or other financial institutions for ultimate delivery to a paying bank. The monitoring system comprises a computer-readable medium providing computer-readable instructions, a display device, and a processor operatively coupled to the display device and the computer-readable medium. The processor is configured to execute the computer-readable instructions to monitor the image send process and use the display device to display information about the image send process.

Further, in one embodiment of the invention the processor is configured to execute the computer-readable instructions to monitor the individual negotiable items and associated image files from the time that the negotiable item is received by the financial institution until the time that the image files are distributed to the financial institution's send partners.

In further accord with another embodiment of the invention, the processor is configured to execute computer-readable instructions to monitor a metric related to the status, quality, or speed of one step in the image send process. Furthermore, the processor is configured to use the display device to display information related to the metric.

In one embodiment of the invention, the metric related to the status, quality, or speed of at least one step in the image send process may be a type of image, the dollar amount associated with the image, the quality of the image, the speed at which the image was transferred, the number of transfers of the image, the duration the image lasts in an image send process step, the deviation from the time that the image is supposed to last in an image send process step, the exception during an image send process step, or the number of images transferred per a specified amount of time.

Further, in one embodiment of the invention, the processor is configured to execute computer-readable instructions to compare the metric to a predefined threshold and signal a warning if the metric is outside the predefined threshold.

In yet another embodiment of the invention, the processor is configured to execute the computer-readable instructions to use the display device to display real-time or near-real-time information about the image send process.

In further accord with another embodiment of the invention, the processor is configured to execute the computer-readable instructions to use the display device to display a dashboard providing information about the current status of the image send process overall. The dashboard allows a user to link to other dashboards that provide information specifically about the steps in the image send process.

Further, in one embodiment of the invention, the image send process comprises capturing an image from a deposited negotiable item at a capture site, pulling the captured images from the capture site to a central repository, assigning endpoint locations indicating where to send the captured images, and distributing the captured images to the endpoint locations. The processor is configured to execute the computer-readable instructions to display a dashboard for each of the capturing, pulling, assigning and distributing processes. Each dashboard at least monitors a status, speed, or quality metric associated for each corresponding capture, pull, assign, or distribute process.

One embodiment of the invention is a method comprising capturing at least one image from one or more customers at a capture site and pulling the at least one image from the capture site to a central repository, then distributing the at least one image, if it is fit for electronic transfer, from the central repository to at least one image send partner. Next, determining at least one metric that occurs during each of the capturing, pulling, and distributing steps of the method and uploading the at least one metric into a monitoring system for analysis.

In accord with another embodiment of the invention, the step of capturing at least one image from the at least one customer at a capture site further comprises lifting at least one image from a paper copy.

Further, in one embodiment of the invention, the step of pulling the at least one image from the capture site to a central repository further comprises reformatting the image into a format that is compatible with downstream applications.

In yet another embodiment of the invention, the step of distributing the at least one image to at least one image send partner comprises assigning the at least one image a classification that is based on at least one of a destination routing and transit number, the capture site, a float variable, a day of the week, a time of the day or an exclusion, then distributing the at least one image to an image send partner based at least partially on the classification that is assigned to the at least one image.

In further accord with one embodiment of the invention, the step of distributing the at least one image to at least one image send partner further comprises sorting the image into batches based on the classification.

In one embodiment of the invention, the step of distributing at least one image to at least one image send partner further comprises grouping the images into image cash letter files for distribution to the at least one image send partner.

In another embodiment of the invention, the monitoring system comprises customized dashboards, and the method further comprises tracking the at least one metric through the customized dashboards. The dashboards display the at least one metric in numerical or graphical form.

In accord with another embodiment of the invention, the selectable customized dashboards have selectable features, and the method further comprises selecting the features within the selectable customized dashboards. Selecting the features relating to the at least one metric allows a user to drill down to additional information related to the at least one metric.

In one embodiment of the invention, the method further comprises monitoring the at least one metric on a monitoring system over a period of time.

In yet another embodiment of the invention, the step of capturing at least one image from the at least one customer at a capture site further comprises performing an image quality analysis on the at least one image.

In yet another embodiment of the invention, the step of performing an image quality analysis on the image further comprises repairing the image if the image fails the image quality analysis.

In further accord with one embodiment of the invention, a metric in the image send process comprises of either the type of image, the dollar amount associated with the image, the quality of the image, the speed at which the image was transferred, the number of transfers of the image, the duration the image lasts in an image send process step, the deviation from the time that the image is supposed to last in an image send process step, the exception during an image send process step, or the number of images transferred per a specified amount of time.

One embodiment of the invention is a method for tracking images within an image send process comprising tracking at least one image from the beginning to the end of the image send process at the individual image level, then monitoring at least one metric that occurs during the image send process or within specific steps within the image send process. The at least one metric relates to a type of image, a dollar amount associated with the image, a quality of the image, a speed at which the image was transferred, a number of transfers of the image, a duration the image lasts in an image send process step, a deviation from the time that the image is supposed to last in an image send process step, an exception in an image send process step, or a number of images transferred per a specified amount of time.

Further, in another embodiment of the invention, the step of monitoring at least one metric comprises uploading the at least one metric into a dashboard. The dashboard displays the at least one metric for real-time or near real-time tracking.

In yet another embodiment of the invention, the image send process comprises receiving at least one negotiable instrument from at least one customer and depositing the negotiable instrument with a financial institution, then creating at least one image file from the negotiable instrument. The step of uploading the at least one metric into a dashboard further comprises uploading at least one metric related to the status, quality, or speed of the receiving and creating processes.

In further accord with the invention, the image send process comprises performing an image quality assurance on the image file. The step of uploading the at least one metric into a dashboard further comprises uploading at least one metric related to the status, quality, or speed of the performing process.

In another embodiment of the invention, the image send process comprises creating at least one electronic image cash letter from the at least one image file. The step of uploading the at least one metric into a dashboard comprises uploading at least one metric related to the status, quality, or speed of the creating process.

Further, in one embodiment of the invention, the image send process comprises sending the at least one image file to an image send partner. The step of uploading the at least one metric into a dashboard further comprises uploading at least one metric related to the status, quality, or speed of the sending process.

In another embodiment of the invention, the image send process comprises capturing data from at least one image file. The step of uploading the at least one metric into a dashboard further comprises uploading at least one metric related to the status, quality, or speed of the capturing process.

One embodiment of the invention is a system for monitoring an image send process where an entity receives a plurality of image items, sorts and combines each image item with other image items to create an electronic image cash letter, and sends the image cash letter to another entity. The system comprises a display device and a processor operatively coupled to the display device. The processor is configured to monitor the image send process and use the display device to display information about the image send process.

In further accord with one embodiment of the invention, the processor is configured to monitor each individual image item associated with the plurality of image items. The monitoring occurs from the time that the image item is received by the entity until the time that the image item is processed by the entity and sent to an image send partner.

In another embodiment of the invention, the plurality of image items comprises a plurality of images of negotiable instruments. The entity comprises a financial institution charged with receiving a monetary amount associated with the plurality of negotiable instruments.

In yet another embodiment of the invention, the processor is configured to monitor at least one metric related to the status, quality, or speed of at least one step in the image send process. The processor is configured to use the display device to display information related to the at least one metric.

Further, in one embodiment of the invention, the at least one metric related to the status, quality or speed of at least one step in the image send process comprises at least one of a type of image, a dollar amount associated with the image, a quality of the image, a speed at which the image was transferred, a number of transfers of the image, a duration the image lasts in an image send process step, a deviation from the time that the image is supposed to last in an image send process step, an exception in an image send process step, or a number of images transferred per a specified amount of time.

In further accord with an embodiment of the invention, the processor is configured to compare the at least one metric to a predefined threshold and signal a warning if the at least one metric is outside the predefined threshold.

In another embodiment of the invention, the processor is configured to use the display device to display real-time or near-real-time information about the image send process.

One embodiment of the invention is a computer program product for allowing a user to monitor an image send process. The image send process is where an entity receives a plurality of negotiable instruments and sends an image of each of the plurality of negotiable instruments to one or more other entities. The computer program product comprises at least one computer-readable medium having computer-readable program code portions. The computer-readable program code portions comprise a first executable portion and a second executable portion. The first executable portion is configured for receiving values for one or more metrics related to the status, speed, or quality of the image send process or a step of the image send process. The second executable portion is configured for generating one or more dashboards to be displayed on a display device, wherein the one or more dashboards display at least one of the one or more metrics.

In one embodiment of the invention, the second executable portion is configured to generate a first dashboard that provides information about the current status of the image send process overall. The first dashboard allows a user to drill down to one or more other dashboards that provide information specifically about one or more steps of the image send process.

In another embodiment of the invention, the first and second executable portions are configured to display information about the one or more negotiable instruments. The information relates to the time that the one or more negotiable instruments are received by a receiving bank until the time that the one or more negotiable instruments are distributed to a send partner for ultimate delivery to a paying bank.

In yet another embodiment of the invention, the one or more metrics comprise at least one of a type of image, a dollar amount associated with the image, a quality of the image, a speed at which the image was transferred, a number of transfers of the image, a duration the image lasts in an image send process step, a deviation from the time that the image is supposed to last in an image send process step, an exception during a process step, or a number of images transferred per a specified amount of time.

In further accord with one embodiment of the invention, the computer program product further comprises a third executable portion configured to compare the at least one of the one or more metrics to a predefined threshold or rule. The computer program product signals a warning if the at least one metric is outside the predefined threshold or violates the predefined rule.

In another embodiment of the invention, the first and second executable portions are configured to display real-time or near-real-time information about the image send process.

Further, in another embodiment of the invention, the computer program product further comprises an executable portion that allows a user to customize the appearance of the one or more dashboards and specify which one or more metrics are displayed on the one or more dashboards.

The features, functions, and advantages that have been discussed may be achieved independently in various embodiments of the present invention, or may be combined in yet other embodiments, further details of which can be seen with reference to the following description and drawings.

BRIEF DESCRIPTION OF THE SEVERAL VIEWS OF THE DRAWINGS

Figure 1:
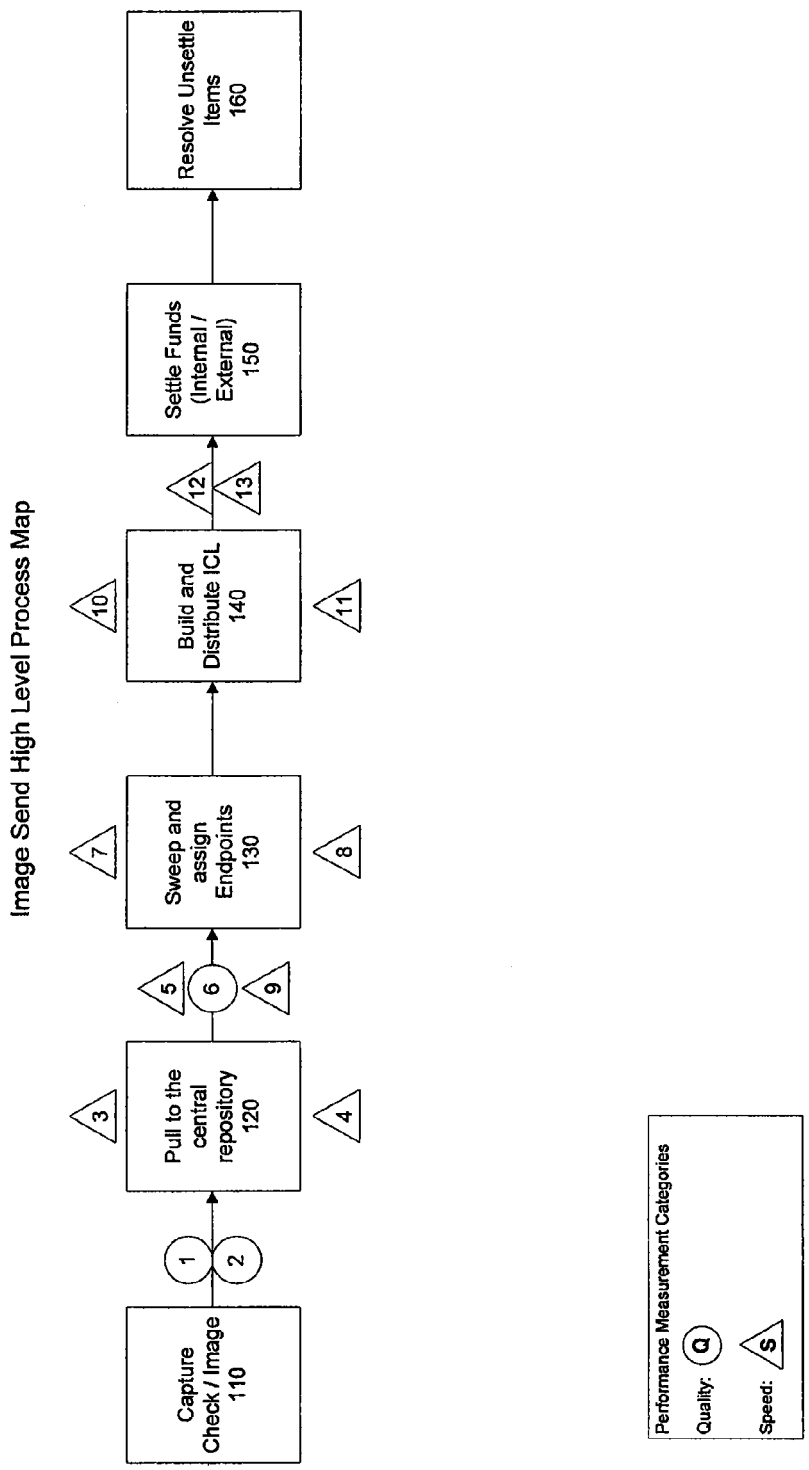
Figure 2:
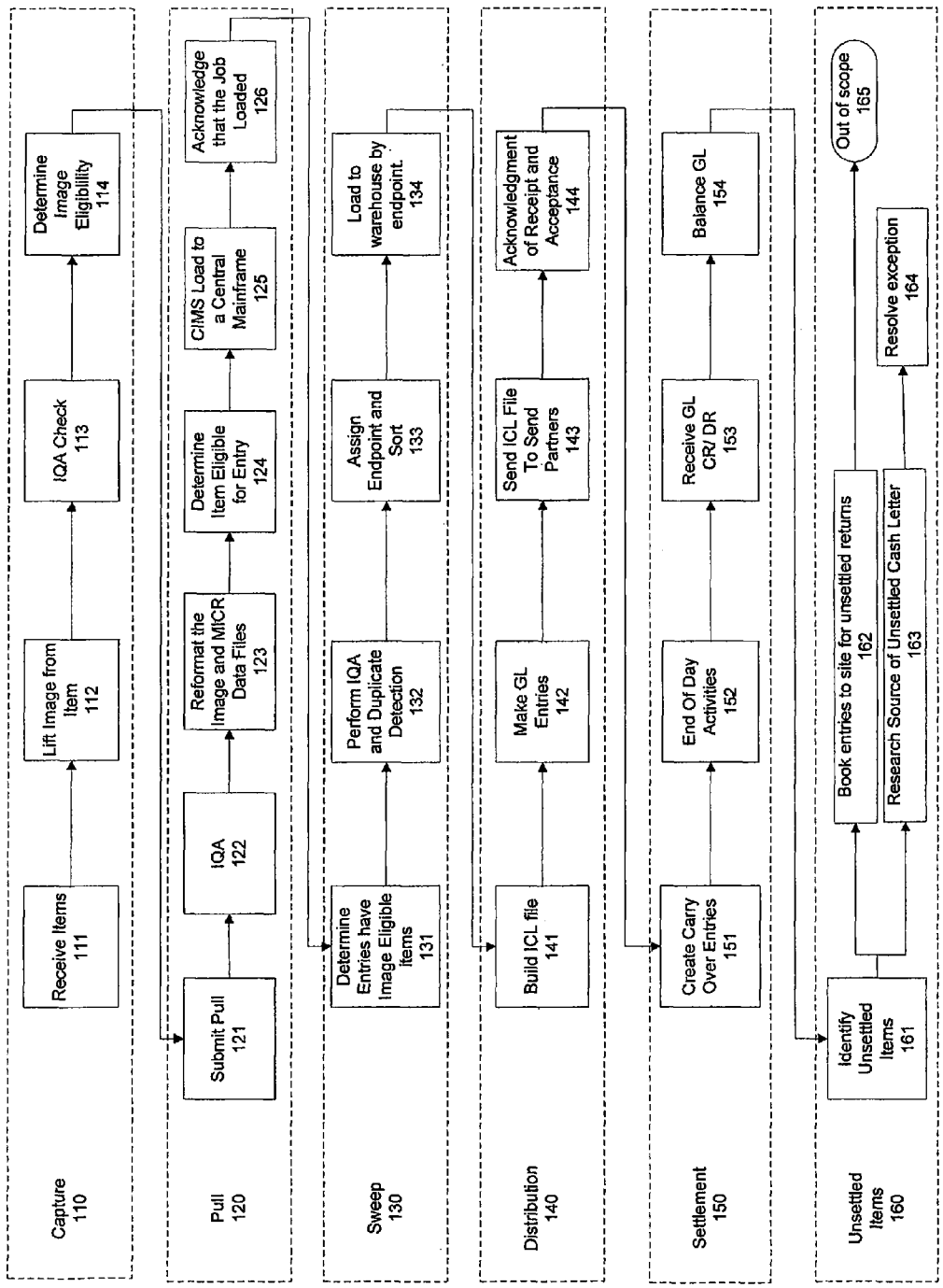
Figure 3:
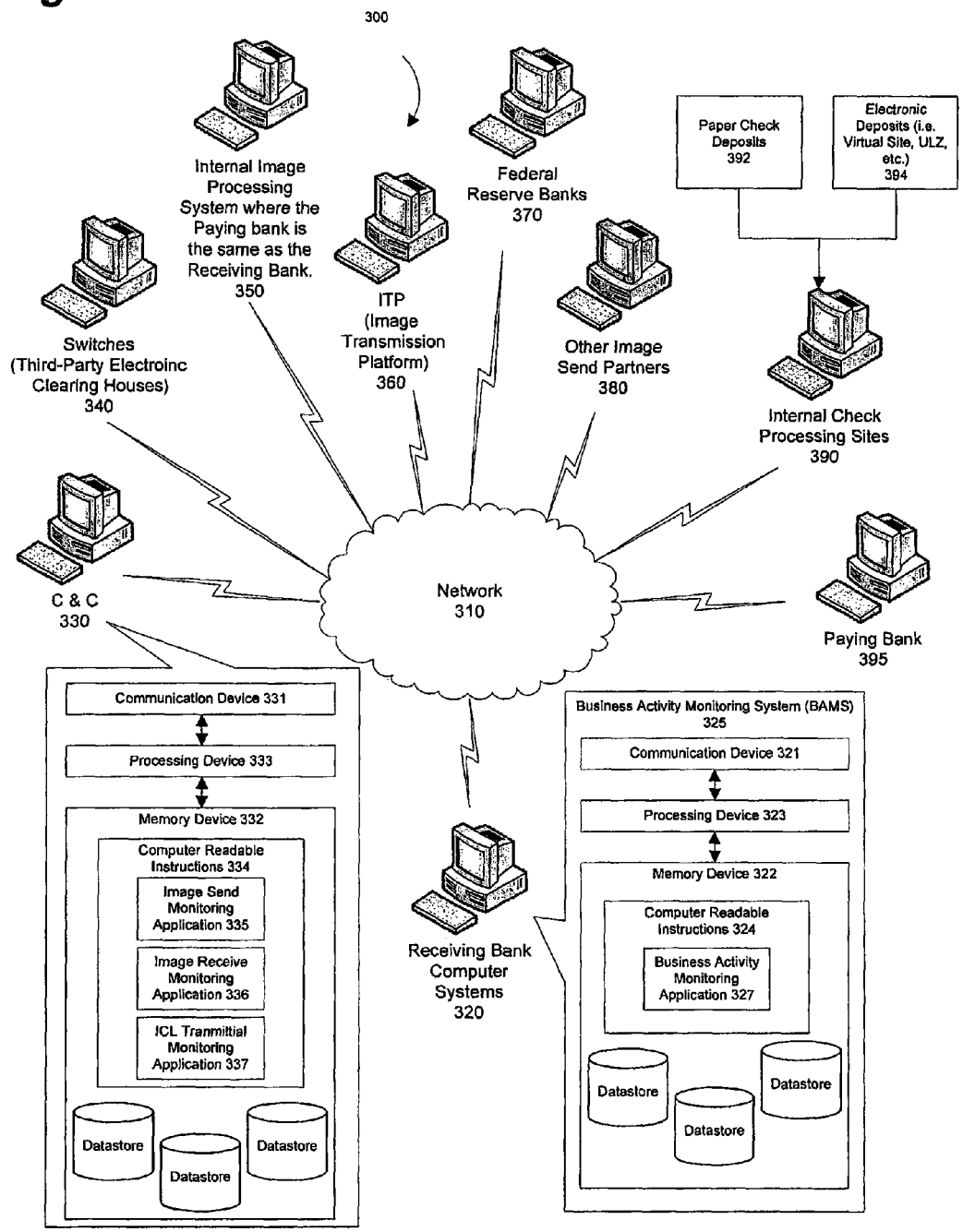
Figure 4:
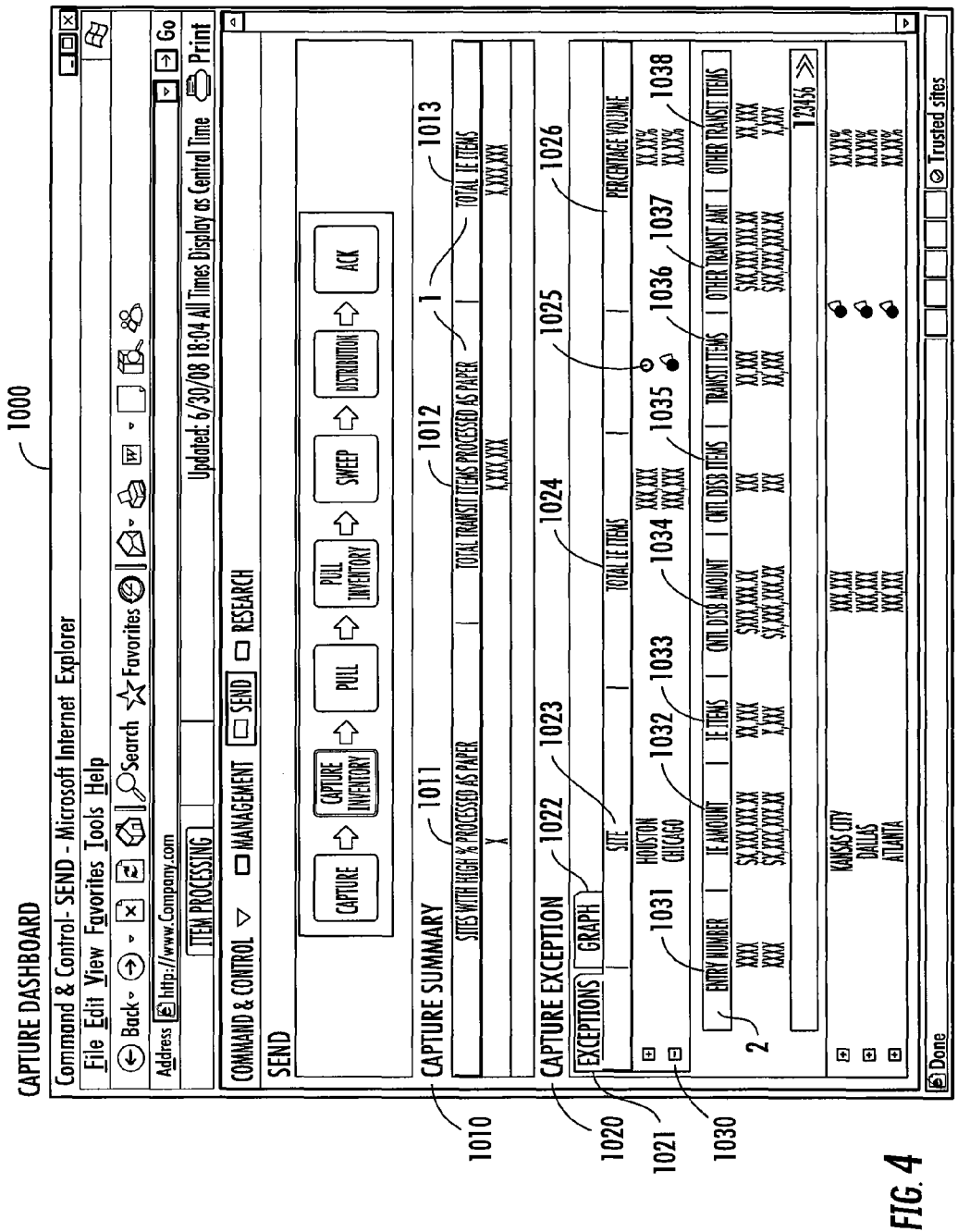
Figure 5:
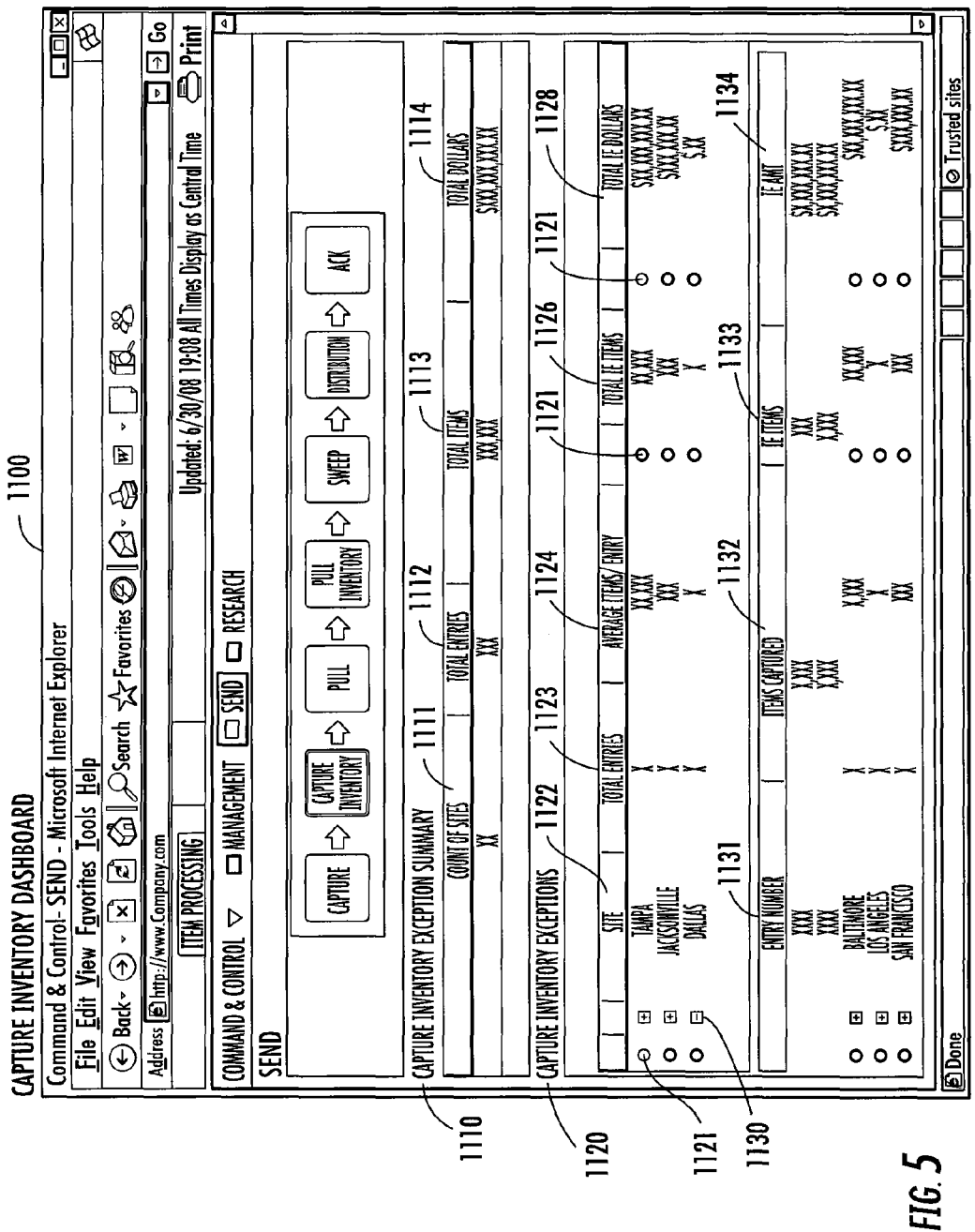
Figure 6:
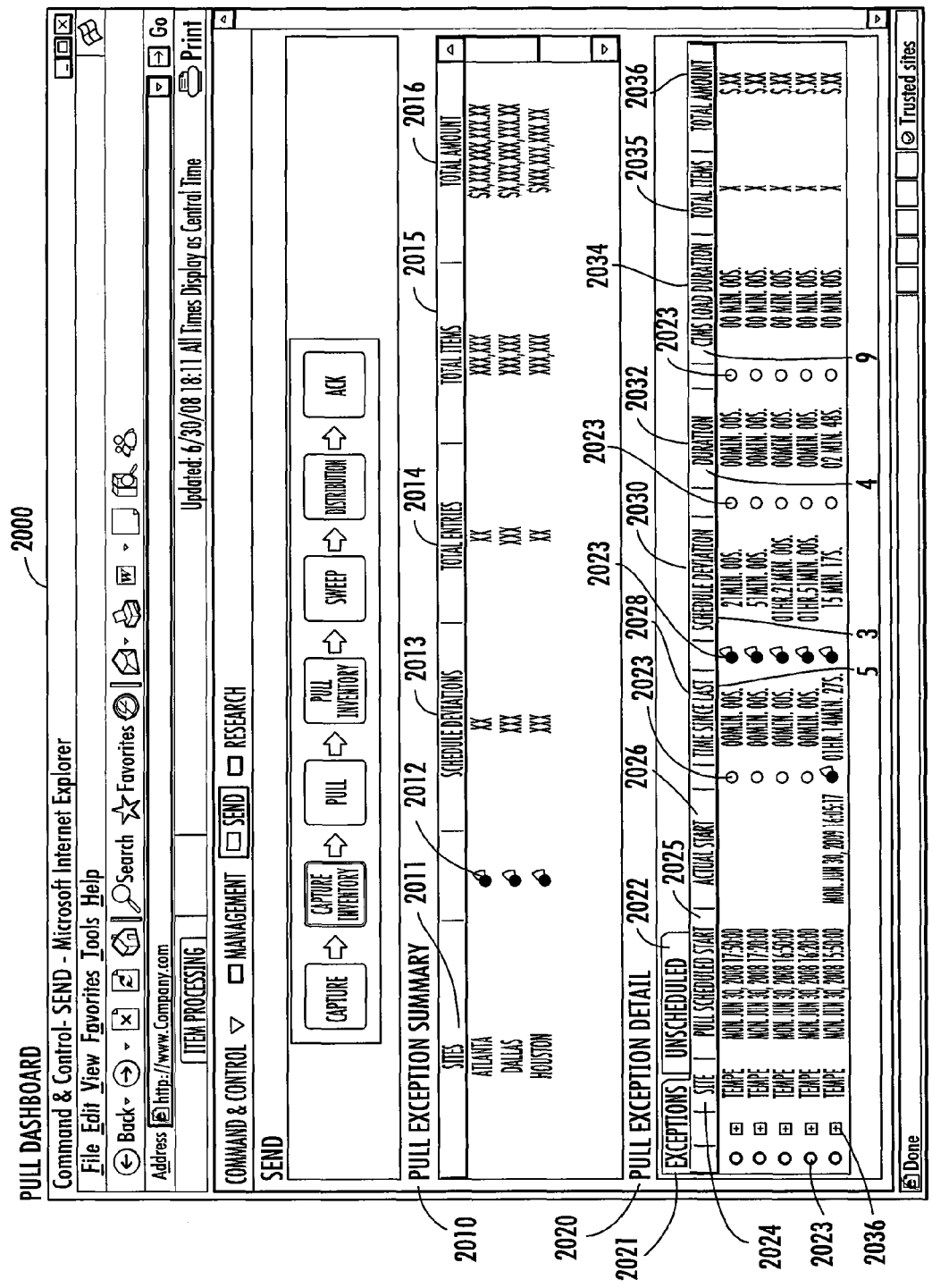
Figure 8:
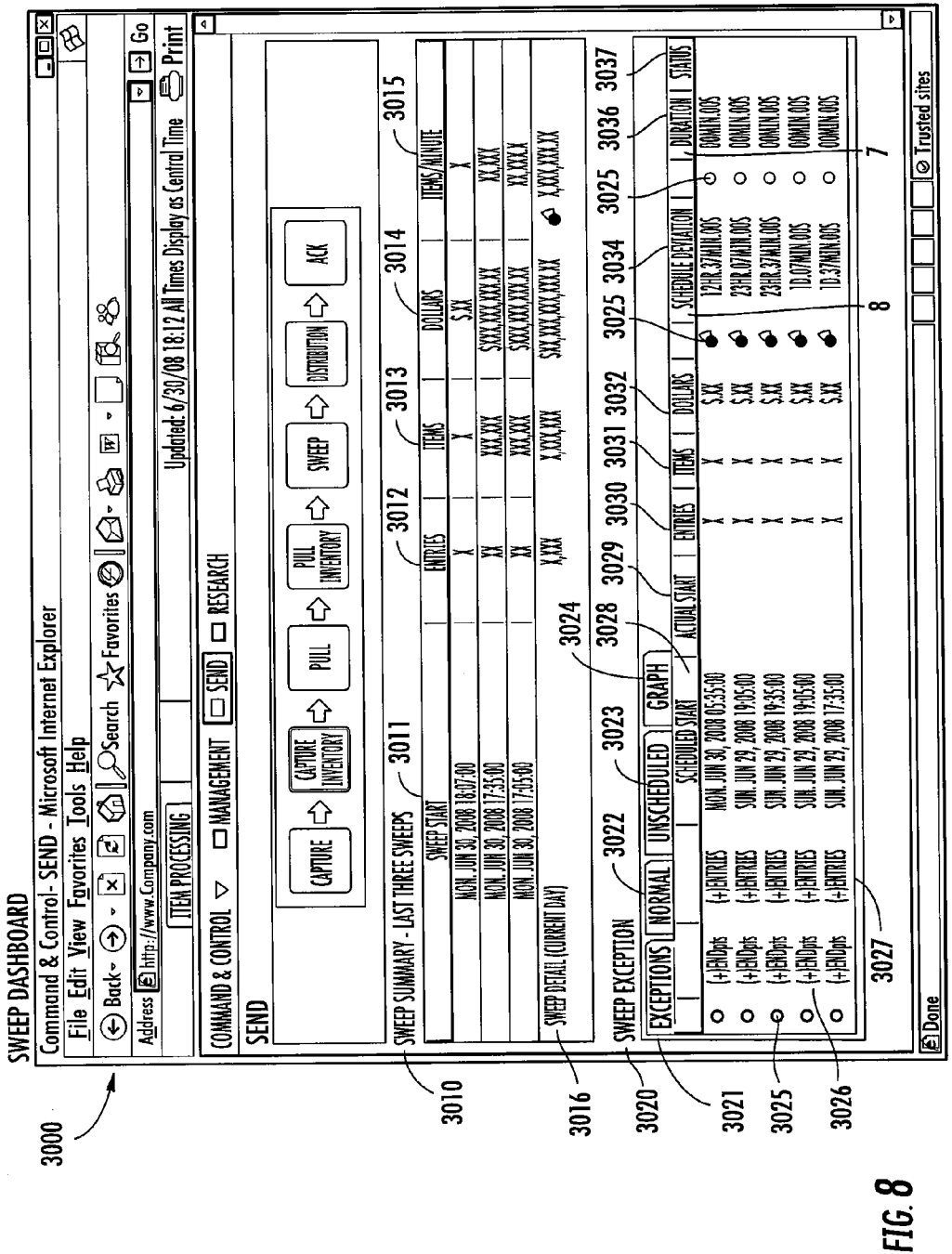
Figure 9:
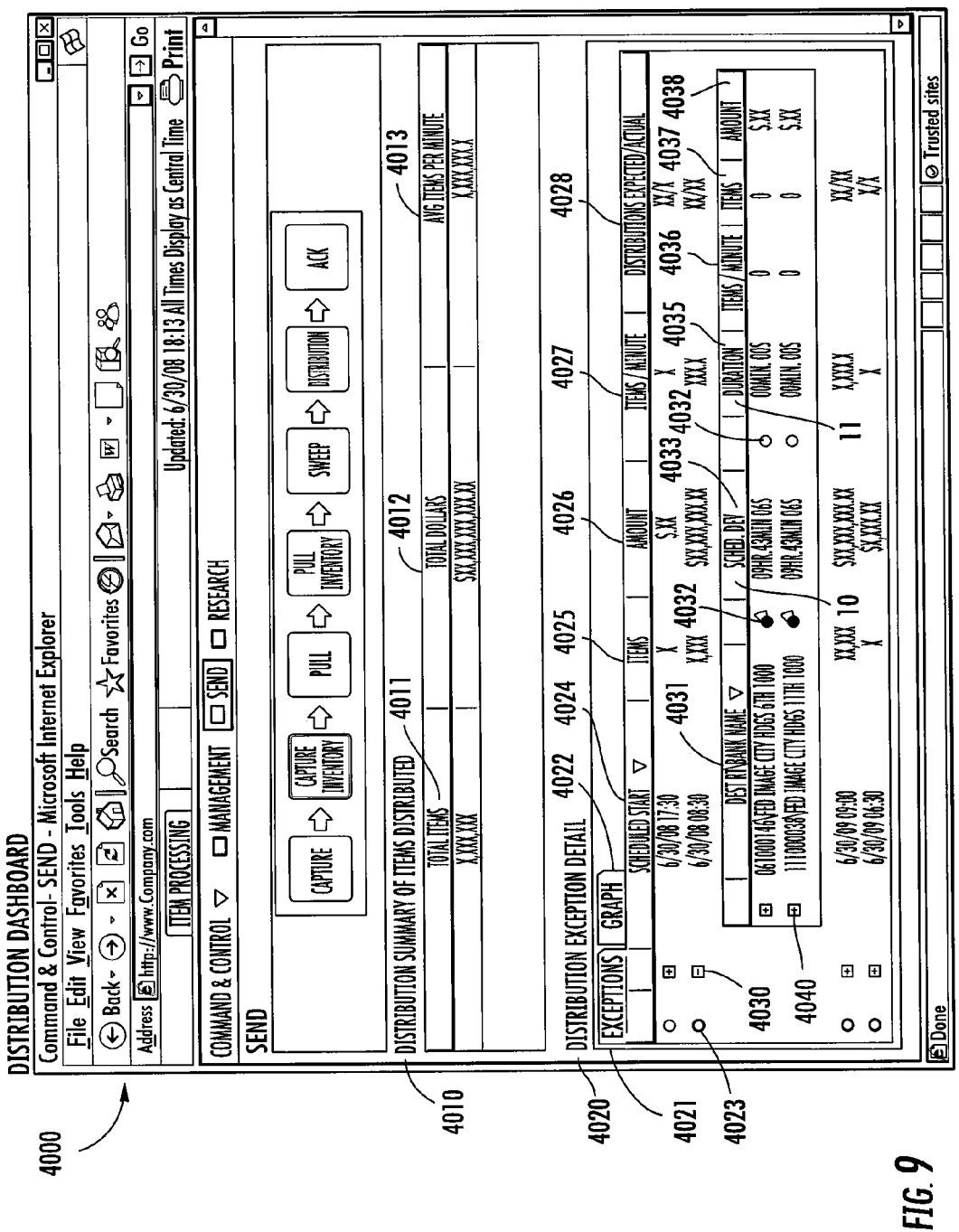
Figure 10:
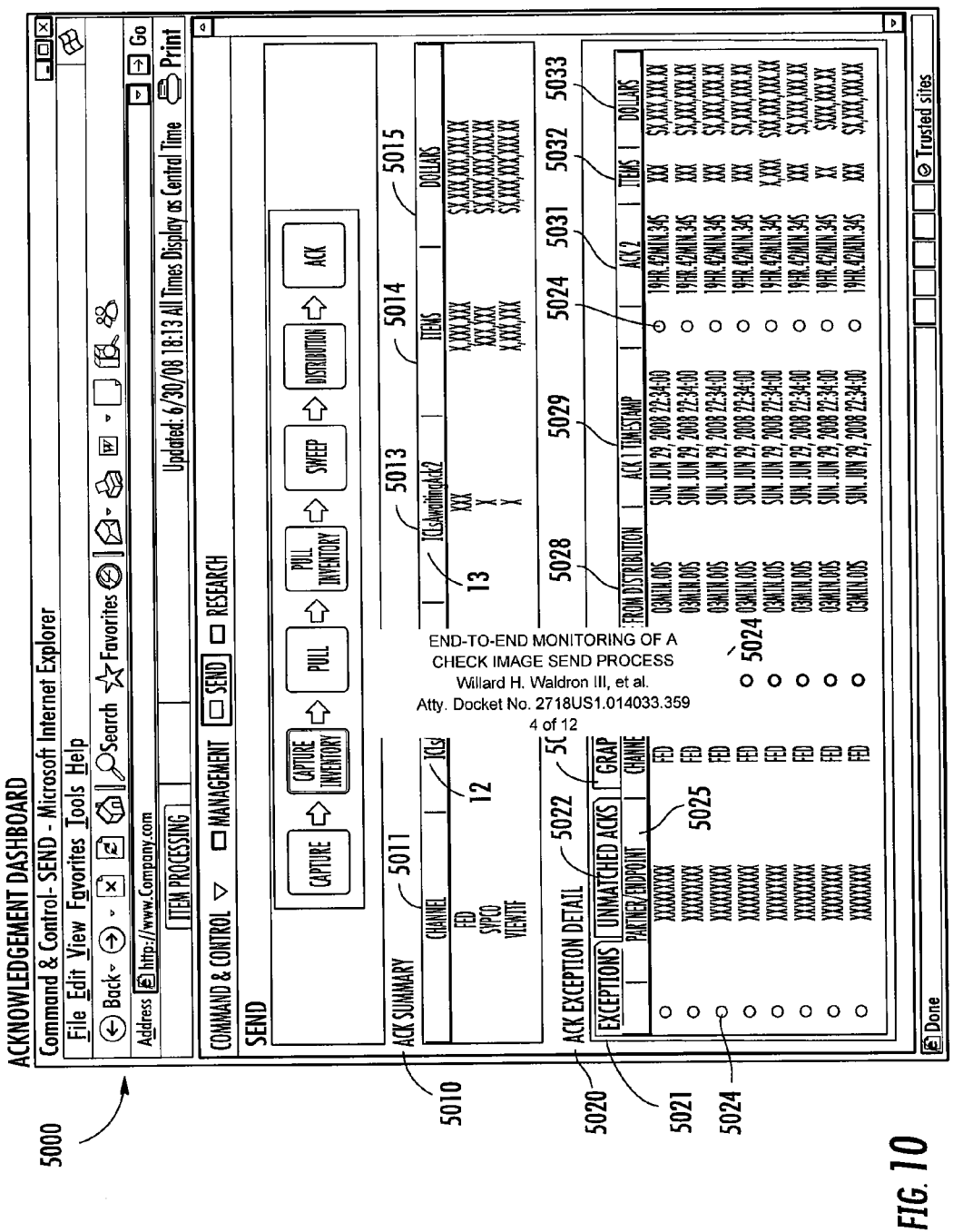
Figure 11:
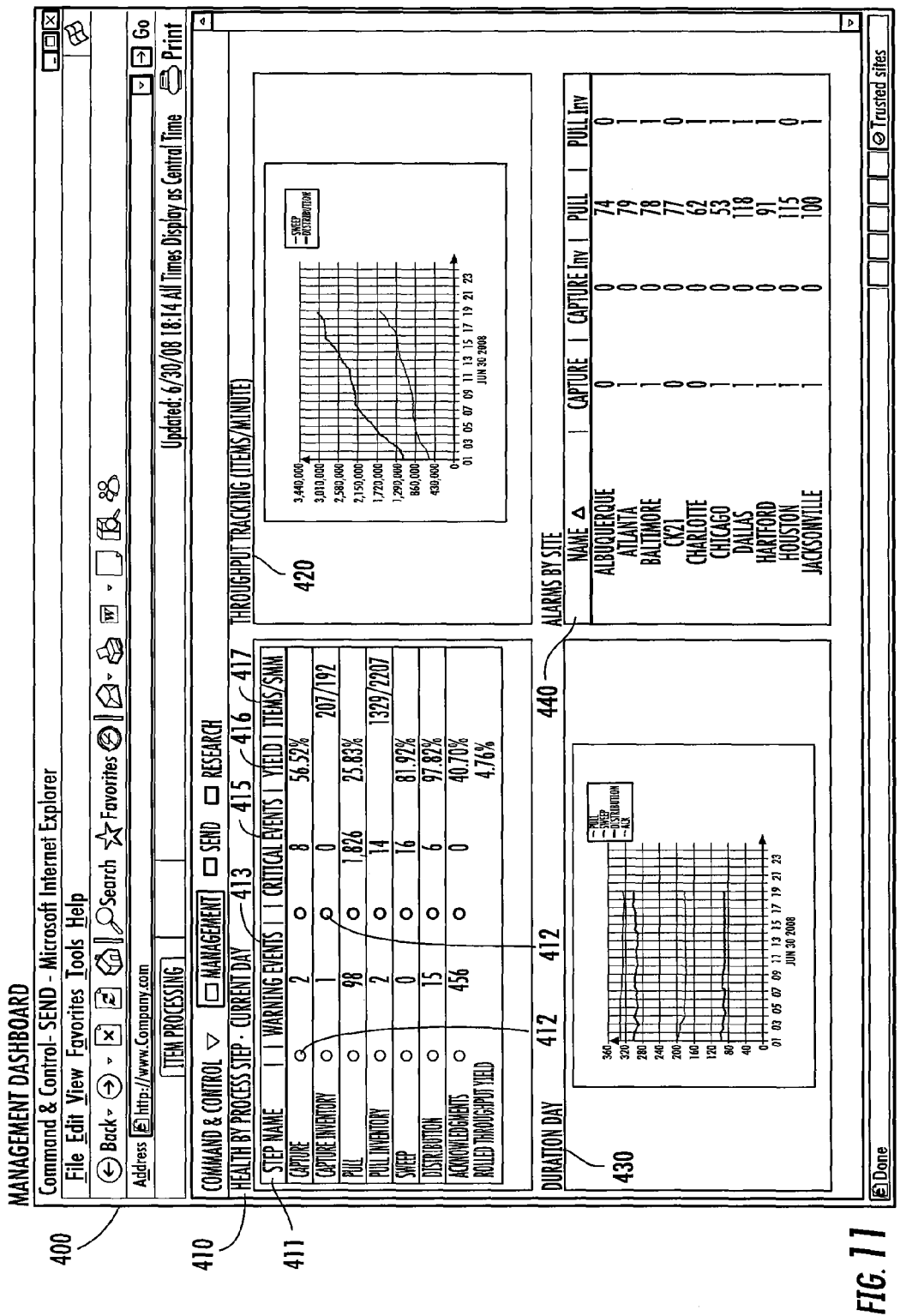
Figure 12:
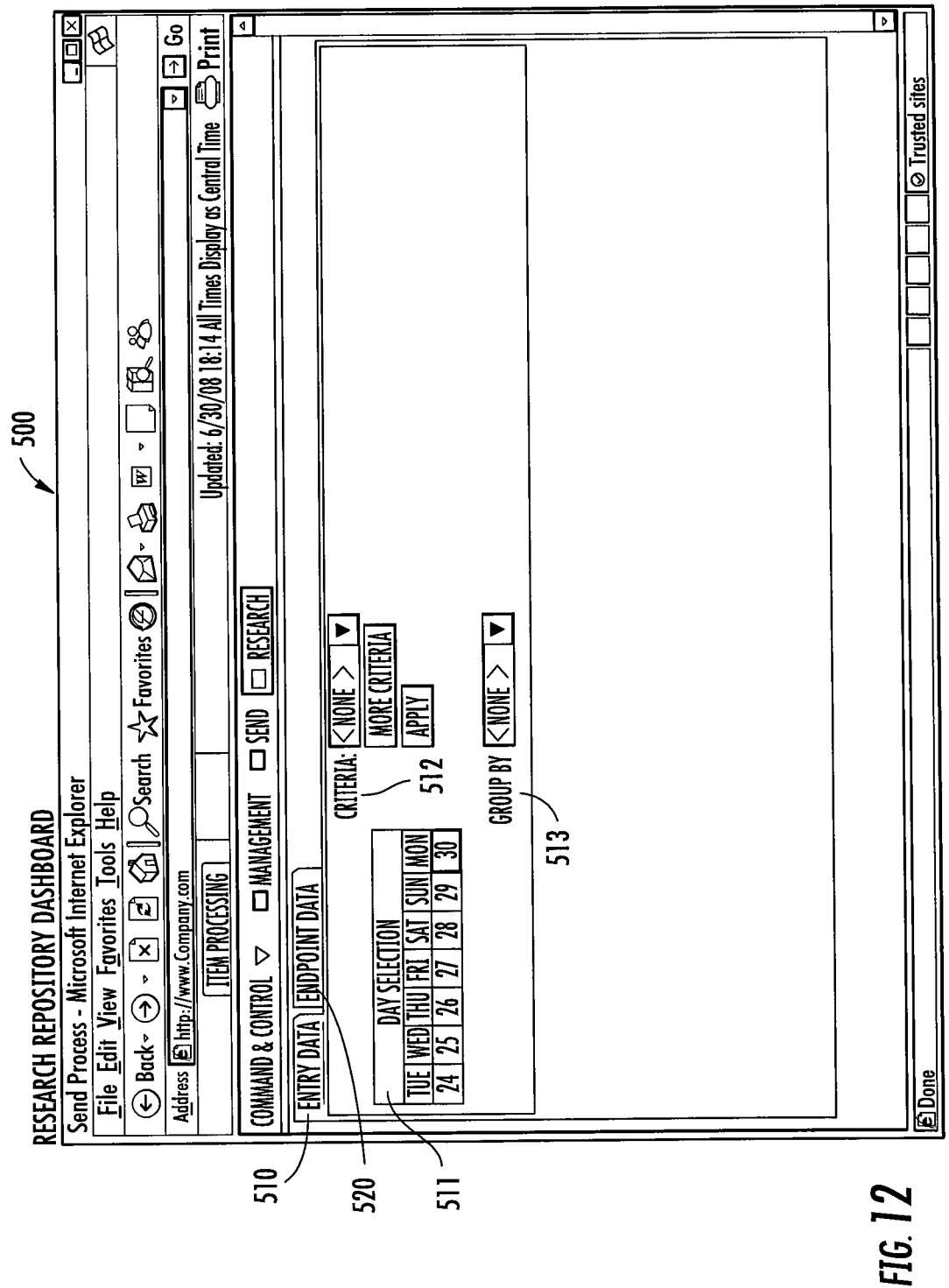

Having thus described embodiments of the invention in general terms, reference will now be made to the accompanying drawings, which are not necessarily drawn to scale, and wherein:

FIG. 1 provides a flow diagram illustrating the major steps involved in the check image send process and some of the associated Critical to Quality metrics ("CTQs") that are monitored during or between each major step in the image send process in accordance with an embodiment of the present invention;

FIG. 2 illustrates a process map outlining in more detail the steps of the image send process in accordance with an embodiment of the present invention;

FIG. 3 illustrates a banking environment in which an embodiment of the present invention exists;

FIG. 4 illustrates the Capture Dashboard in accordance with an embodiment of the present invention;

FIG. 5 illustrates the Capture Inventory Dashboard in accordance with an embodiment of the present invention;

FIG. 6 illustrates the Pull Dashboard in accordance with an embodiment of the present invention;

FIG. 7 illustrates the Pull Inventory Dashboard in accordance with an embodiment of the present invention;

FIG. 8 illustrates the Sweep Dashboard in accordance with an embodiment of the present invention;

FIG. 9 illustrates the Distribution Dashboard in accordance with another embodiment of the present invention;

FIG. 10 illustrates the Acknowledgment Dashboard in accordance with an embodiment of the present invention;

FIG. 11 illustrates the Management Dashboard in accordance with an embodiment of the present invention; and FIG. 12 illustrates the Research Repository Dashboard in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as being limited to the embodiments set forth herein; rather, these embodiments are provided so that this disclosure will satisfy applicable legal requirements. Like numbers refer to like elements throughout. Although the embodiments of the invention described herein are generally described as involving a "bank," one of ordinary skill in the art will appreciate that other embodiments of the invention may involve other businesses or financial institutions that take the place of or work in conjunction with the bank to perform one or more of the processes or steps described herein as being performed by a bank.

As will be appreciated by one of skill in the art, the present invention may be embodied as a method, system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by, or in connection with, the instruction execution system, platform, apparatus, or device. The computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber cable, radio frequency (RF) or other means.

Computer program code/computer-readable instructions for carrying out operations of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments of the present invention further provide a plurality of dashboards to be displayed using a display device communicatively coupled to a computing device. The figures provided herein illustrate examples of such dashboards. These dashboards are generated and operated by a processor executing computer-readable program instructions embodied in a computer-readable medium.

FIG. 1 provides a flow diagram illustrating the major steps involved in the check image send process in accordance with an embodiment of the present invention. As represented by block 110, the image send process generally begins with capturing a check or image item that is deposited into the bank by a customer of the bank. During this step, the paper copies or image items are sent to a site and sorted into the appropriate Entries, which are blocks of captured items indexed by the information on the checks, where they came from, or some other method of indexing, for recordkeeping purposes. If the items are paper copies, images of the front, back and MICR data are taken, then the image files are pulled from each of the sites into a central repository computer system, such as the computer system called TrX, as represented by block 120, where an Image Quality Analysis ("IQA") is preformed on the images. TrX is a target computer system for routing, settlement and warehousing of all or substantially all transactions processed by a bank. Block 130 of FIG. 1 represents the next step in the process called a "Sweep." During the Sweep step, images are assigned an endpoint location and they are sorted into groups of Image Cash Letters ("ICLs") going to the same endpoint location. Next, the image files are distributed to the pre-determined destinations at pre-determined times, as represented by block 140. Then the accounts for the files and funds, which were distributed, are settled, as illustrated by block 150 in FIG. 1. Finally, as represented by block 160, the unsettled items are identified and researched to find the associated issues and close out the unsettled items. FIG. 2, described further below, provides a more detailed illustration of the image send process in accordance with an embodiment of the present invention.

FIG. 3 illustrates a banking environment 300 in which an embodiment of the present invention exists. As illustrated in FIG. 3, the receiving bank includes a computing system 320 communicatively coupled, via a network 310, to the computing systems of one or more Check Processing Sites 390. The Check Processing Sites 390 receive paper checks, which are deposited by customers in locations such as bank branches, as well as electronic image items, which are processed through electronic sites, such as Virtual Site and ULZ. The Sites 390 lift the images from the checks if necessary, and sorts them into the appropriate categories. In this way, the receiving bank 320 can receive electronic data regarding the check images from these Sites 390. The receiving bank's computing system 320 is also communicatively coupled, via a network 310, to the computing system of one or more image send partners, such as Third-Party Electronic Clearing Houses 340, Internal Image Processing Systems 350, Image Transmission Platforms ("ITP") 360, the Federal Reserve Banks ("FED") 370, an other Send Partners 380. In this way, the receiving bank 320 can send electronic data related to the check images downstream to the paying bank 395, either directly or through one or more send partners. The network 310 may be a global area network (GAN), such as the Internet, a wide area network (WAN), a local area network (LAN), or any other type of network or combination of networks. The network 310 may provide for wireline, wireless, or a combination of wireline and wireless communication between devices in the network.

In one embodiment of the invention, the receiving bank has a Command & Control ("C&C") center 330 for monitoring the image sending process and, potentially, other bank processes. Although FIG. 3 illustrates the C&C center 330 as a separate computing system from the receiving bank's general computing system 320, in other embodiments the C&C center 330 is part of the bank's general computing system 320.

C&C 330 generally comprises a communication system 331, a memory system 332, and a processing system 333 operatively coupled to the communication system 331 and the memory system 332. The processing system 333 uses the communication system 331 to communicate with the network 310 and with users of the C&C computing system 330. As such, the communication system 331 generally comprises a modem, server, or other device(s) for communicating with other devices on the network 310 and a display, mouse, keyboard, microphone, and/or speakers for communicating with one or more users. As further illustrated in FIG. 3, C&C 330 includes computer-readable program instructions 334 stored in the memory system 332 which includes the computer-readable instructions 334 of an Image Send Monitoring Application 335.

As described in greater detail below, the Image Send Monitoring Application 335 presents real-time information about the image send system and process to a user of the C&C computing system 330 and to the line of business ("LOB") in charge of each part of the send process. In this way, it is easy for the users to continuously monitor the image send system and process in real time or near real time. In one embodiment, the Image Send Monitoring Application 335 of C&C 330 gets real-time information about the image send system and process from a Business Activity Monitoring System 325, which may be operated on the C&C computing system 330 or, as illustrated in FIG. 3, on another of the bank's computing systems 320.

As illustrated in FIG. 3, the Business Activity Monitoring System 325 generally comprises a communication system 321, a memory system 322, and a processing system 323 operatively coupled to the communication system 321 and the memory system 322. The processing system 323 uses the communication system 321 to communicate with the network 310. As such, the communication system 321 generally comprises a modem, server, or other device for communicating with other devices on the network 310. As further illustrated in FIG. 3, the Business Activity Monitoring System 325 includes computer-readable instructions 324 stored in the memory system 322 which includes the computer-readable instructions 324 of the Business Activity Monitoring Application 327. The Business Activity Monitoring Application 327 comprises a computer program that instructs the processing system 323 to monitor the Critical to Quality metrics (CTQs) within the bank's infrastructure, applications, and processes in real time or near real time, and pushes or pulls this data into one or more data stores in the memory system 322 and/or to C&C 330. In one embodiment of the invention, the Business Activity Monitoring Application 327 comprises the known BusinessBridge software package offered by Systar.

As described in greater detail below, the Image Send Monitoring Application 335 provides a process and associated dashboards that utilize the Business Activity Monitoring System 325 to gather, store, and/or display information about the image send system and process at the C&C center 330. Specifically, the Image Send Monitoring Application 335 of embodiments of the present invention provide an end-to-end real-time or near-real-time view of the process of sending and processing check images. Typically, the Image Cash Letter files that are tracked through this process include check images and data, along with other negotiable items, which are transferred through the banks.

Referring again to FIG. 2 as described above, FIG. 2 illustrates a process map of one embodiment of the invention outlining the steps of FIG. 1, from first capturing a file image at the beginning of the process to the end of the process when the image file is sent directly to the paying bank or through the send partners and the accounts are settled. FIG. 1 also indicates, within each major process step, some of the most important CTQs that are pushed or pulled into C&C 330 and tracked by the Image Send Monitoring Application 335. The CTQs in FIG. 1 are identified by a circle or triangle with a reference number inside, relating to either the quality or speed of the process. However, it is understood that the process map listing the particular CTQs is not an exclusive list. Monitoring the listed CTQs may occur during other process steps and other metrics may be measured and captured within the process.

In one embodiment of the invention, block 111 indicates the first step in the Capture process 110, as illustrated by FIG. 2, where the receiving site receives the paper copies of the checks or other negotiable instruments. The bank receives paper checks 392 from various customers, including individuals and organizations, who deposit checks to the bank through any number of means, such as through a bank teller. The paper checks are sent to local processing sites, as illustrated by block 390 in FIG. 3. A sorter at each processing site will capture the items and electronically categorize them into the appropriate units or entries.

Block 112 represents the next step in the Capture process 110, which involves lifting the images from the paper checks. Images of the front and back of the checks are captured, along with specific areas of the check, such as the endorsements and the MICR data, including the check number, bank routing and transit numbers, checking account number and in some cases, the check amount. It is understood that in some embodiments checks may be deposited as images in the bank through ATMs or Recyclers, thus the paper checks may not need to be sent to the Processing Sites 390 for sorting. In some embodiments, the paper checks may be sorted and the images uploaded directly at the deposit location.

After the images are lifted from the item, an Image Quality Analysis ("IQA") is preformed on the image item to determine whether or not the images are of a quality to be processed electronically, as illustrated in block 113 of FIG. 2. This IQA Check is rudimentary and is done to ensure the item is usable, in that it is not too light, or dark, or misaligned. The next step in the Capture process 110 is represented by block 114, and involves determining the image eligibility of the items. Images that pass the IQA will move to the next step in the process. However, images that do not pass the IQA may be repaired and submitted again as images files. If the rejected images can't be repaired, they will remain as paper copies and travel another route for processing. Two Critical to Quality (CTQ) metrics may be tracked during the Capture process: the first being the ratio of image eligible items compared with those needing to be processed as paper 1; the second being the inventory of items and amount of money captured as image and/or paper at the entry level 2.

At this point in the process, the Business Activity Monitoring Application 327 will query data related to the CTQs and other metrics for the Capture process 110 from the Check Processing Sites 390 and send the data to the C&C center's 330 Image Send Monitoring Application 335. The C&C center 330 monitors the capture metrics through the Image Send Monitoring Application's 335 dashboards. FIG. 4 illustrates one embodiment of a dashboard for the Capture dashboard 1000, which generally provides an understanding of what percentages of incoming checks can be captured and processed as images and what percentage are processed as paper files. The Capture dashboard 1000 displays the items that have been separated into the appropriate item types and are listed at entry numbers 1031.

The Capture dashboard 1000 has a Capture Summary zone 1010 and a Capture Exception zone 1020. The Capture Summary zone 1010 indicates the number of sites with a "high" percentage of paper processed checks 1011, the Total Transit Items process as paper 1012, and the Total Image Exchange ("IE") Items 1013 processed as images. The Capture Exception zone 1020 has a tab for exceptions 1021 and a tab for a graph 1022, which displays the capture exceptions graphically. The exceptions tab 1021 lists the Processing Site 1023, the Total IE Items 1024, status indicators for the site 1025, and the percentage volume 1026 for each site. The status indicator 1025 lets the user know, based on the color, if the site is within, getting close to, or outside the threshold limits for the metric it is associated with. More detail relating to each site may be examined by selecting a drilldown button 1030. This displays information relating to each exception for each Processing Site 1023, such as the Entry Number 1031 of the exception, the IE Amount 1032, the IE Items 1033, the Control Disbursement Amount 1034, the Control Disbursement Items 1035, the Transit Items 1036, the Other Transit Amount 1037, and the Other Transit Items 1038. The Transit Items 1036 are all the items that are required to be processed as paper, including the Controlled Disbursement Items 1035, which are items that the client must examine before authorizing payment. The Other Transit Items 1037 are any other items that do not fit into a major classification. Monitoring the Capture process 110 provides data that identifies new opportunities to get more items into the image stream and out of the paper processing stream. The Capture Dashboard 1000 also secures the process from internal changes that may adversely impact the image/paper ratio. For example, monitoring the Capture process 110 protects the process from erroneous sort pattern changes, which could consist of incorrectly labeling items as image ineligible.

FIG. 5 illustrates one embodiment of the Capture Inventory dashboard 1100, which represents entries that have been systematically separated but have not yet been "pulled" from the local capture sites and transmitted to a central repository for processing. The Capture Inventory dashboard 1100 provides an understanding at the site level of what images are waiting to be processed by a pull. The Capture Inventory dashboard 1100 has a Capture Inventory Exception Summary zone 1110 and a Capture Inventory Exceptions zone 1120. The Capture Inventory Exception Summary zone 1110 displays the Count of the Sites 1111 being tracked, the Total Entries 1112 that are exceptions, the Total Items 1113 for those entry exceptions, and the Total Dollars 1114 for the entry exceptions. The Capture Inventory Exceptions zone 1120 lists status indicators 1121, Processing Sites 1122, the Total Entries 1123 that are exceptions, the Average Items/Entry 1124, the Total IE Items 1126, and the Total IE Dollars 1128. The status indicators display whether a metric is within, outside, or near being outside of the set threshold limits. More detail relating to each site may be examined by selecting a drilldown button 1130, which displays the Entry number 1131 for the exceptions, the Items Captured 1132, the IE Items 1133, and the IE Amount 1134 for each entry number at each Site 1122. Capture Inventory monitoring provides insight into bottlenecks in the Capture process because it lays out information related to Captured items that have not been Pulled into the central repository. The inventory dashboard may also be used as a predictive tool on how these processes may perform in the near future.

In one embodiment of the invention, the second process in the Image Send process 100 is a data Pull, as illustrated by block 120 in FIG. 2. The first step in the Pull process 120 is to Submit a Pull, which is illustrated by block 121. A Pull 121, takes the images and MICR data that were captured at the local sites and pulls them into the central repository for processing. Pulls 121 can be preformed manually, or set up to run continuously or after a specified amount of time, but in one embodiment the Pull 121 takes place every 15 minutes.

The second step in the Pull process 120 is to perform an IQA, as illustrated by block 122 in FIG. 2. Unlike the rudimentary IQA Check 113 in the Capture process 110, this IQA assesses readability of the images to determine if the dollar amount can be read, if the image data matches the MICR data, etc.

After the IQA is performed, block 123 illustrates that the next step is to begin creating the reformatted files, which is done by extracting data from the check processing control system and reformatting the data for interfacing with downstream applications. The reformatted files may be used to sort and process the file. The image stream files and the MICR data stream files are processed separately in a pull. The image stream files are examined for readability, while the MICR data stream files are examined for comparison to the image data for concurrence and duplicate detection.

As illustrated by block 124, the next step is to determine if the newly formatted file items are eligible for entry into ICLs. If not, they are flagged as not fit for an ICL and are processed as paper copies. In one embodiment, if they are fit for entry into ICLs, the file items are sent to a central mainframe LPAR, dedicated to image processing, via a process termed a CIMS load, as represented by block 125. Check Images Management System ("CIMS") is the facility utilized for short-term storage of check images on host Logical Partitions ("LPAR"), which are operating systems and associated hardware created to partition a larger computer into smaller, independent operating units. In this step, the central mainframe is used as a central repository for image/MICR data until the Sweep process 130 occurs. Finally, as illustrated by block 126 an Acknowledgement Job is loaded to the central repository to acknowledge and track that the ICL files were loaded to the central mainframe. This step also triggers CPCS that another pull can begin.

Five CTQ metrics may be tracked during or after the Pull process 120, the first being the Deviation from the Pull Schedule 3, which measures the difference in time from the actual scheduled Pull time. The second CTQ metric is the Pull Duration 4, which is a measurement of the time it took the Pull to occur. The third CTQ metric is the Time since last Pull 5, which is a measure of the time between the Pull being examined and the Pull that took place immediately beforehand. The fourth CTQ metric is the Inventory of Items and associated dollar amounts after the Pull and at the Sweep entry level 6. The fifth CTQ is the Completion time of the CIMS Load Job 9. These metrics and others are measured and tracked in the Pull Dashboard 2000 and the Pull Inventory Dashboard 2100 discussed further below.

At this point in the process, the Business Activity Monitoring Application 325 will query data related to the CTQs and other metrics for the Pull 120 process from the Check Processing Sites 390 and send the data to the C&C center's 330 Image Sending Monitoring Application 335. The C&C center 330 will monitor the Pull metrics through the Image Send Monitoring Application's 335 dashboards. FIG. 6 illustrates one embodiment of the Pull Dashboard 2000, which provides measurements for schedule deviation and duration of the batch of entries that are pulled from the local sites. The Pull Dashboard 2000 has a Pull Exception Summary zone 2010 and a Pull Exception Detail zone 2020, which are broken down further into an Exceptions tab 2021 and an Unscheduled tab 2022. The Pull Exception Summary zone 2010 lists the Site 2011, status indicators 2012, the Scheduled Deviations 2013, the Total entries 2014, the Total Items 2015, and the Total Amount 2016 of the exceptions for a particular site. The Exceptions tab 2021 of the Pull Exceptions Detail zone 2020 includes status indicators 2023, and lists the Site 2024, the Pull Scheduled Start 2025, the Actual Start 2026, the Time Since Last Pull 2028, the Schedule Deviation 2030, the Duration 2032, the CIMS Load Duration 2034, the Total Items 2035, and the Total Amount 2036. More detail relating to a Site's 2024 Scheduled Pull Start 2025 entries in the Pull Exception Detail zone 2020 can be examined by selecting a drilldown button 2036. The Unscheduled tab 2022 shows pulls that cannot be associated with a scheduled start time. For instance, if a pull is scheduled at 1:00 PM and is on a 30-minute cycle, if the 1:00 PM pull occurs as scheduled and another pull occurs before the next scheduled event at 1:30 PM, the second pull is deemed unscheduled as it is considered an extra pull. The metrics measured in the Pull Dashboard 2000 relating to duration time are tracked because the duration information provides insight into how well the Pull process is performing. The metrics relating to the Schedule Deviations are tracked because the schedule deviation provides insight into the regularity and timeliness of the Pull process 120.

FIG. 7 illustrates one embodiment of the Pull Inventory Dashboard 2100, which provides measurements of images waiting for the sweep process on both a site and total level. The Pull Inventory Dashboard 2100 has a zone for the Pull Inventory Summary of All Sites 2110 and a zone for the Pull Inventory Exception Detail 2120. The Pull Inventory summary of All Sites zone 2110 lists the Count of the number of Sites 2111 being monitored, the Total Number Entries 2112, the Total number of Items 2113, and the Total Dollars 2114 that are exceptions at all the sites. The Pull Inventory Exception Detail zone 2120 lists status indicators 2121 for each Site 2122, the Total Entries 2123 that are exceptions, the Average Items Per Entry 2124, the Total IE Items 2126, and the Total IE Dollars 2128. More detail relating to the specific entries within each Site 2122 in the Pull Inventory Exception Detail zone 2120 can be examined by selecting a drilldown button 2130. The drilldown information lists for each Site 2122, the specific Entry Number 2131, the Total IE Items 2132, and the Total IE Dollars 2133 for each Entry Number 2131. The Pull Inventory Dashboard 2100 metrics are measured because they provide insight into the bottlenecks in the Sweep process 130. This dashboard can also be used as a predictive tool on how this process may perform in the near future.

In one embodiment of the invention, the Sweep process 130 is the third major process in the Image Send process 100. The first step in the Sweep process 130 is to determine if the new Entries within the central repository system have Image Exchange Eligible Items by scanning the central repository for the presence of new images, as represented in block 131 of FIG. 2. The Sweep scan may be performed manually or automatically, at a set time during the day, or each time a set period of time passes. In one embodiment of the invention, the Sweep is performed every 20 minutes. The second step in the Sweep process 130 is to perform the IQA and Duplicate Detection processes, as illustrated by block 132. These two processes make sure the image quality of the items is still acceptable for processing. The IQA checks to make sure the files were not corrupted during the CIMS load and checks the critical areas of the file, like the endorsements, while the Duplicate Detection checks that there are not any duplicate items that have already been swept during a previous iteration of the Sweep process 130. If the image file fails the IQA, the file may be processed as a paper file. Once an item has been identified as image eligible, the entry is updated with the proper information and the items are then re-sorted from an entry level grouping to an endpoint level grouping. Therefore, the next step in the process is to Assign an Endpoint or Destination using the RT number, capture site, float variable, day of the week, time of day, and/or exclusions if any. After the endpoints are assigned to the eligible items, the eligible items are Sorted, as represented by block 133. The endpoint will determine the destination of the item. After the items have endpoints, they are loaded to the warehouse using the endpoint or destination assignments from block 133. Items with the same endpoint or destination are grouped together. Each group has a predefined schedule as to when it is to be sent to a partner, vendor or the Federal Reserve ("FED"). Two CTQs may be tracked during or after the Sweep process 120: the first being the Sweep Duration 7; the second CTQ is the Deviation from the Sweep Schedule 8. These CTQs and other metrics may be tracked in the Sweep Dashboard 3000.

At this point in the process, the Business Activity Monitoring Application 327 will pull data related to the CTQs and other metrics for the Sweep 130 steps from the central repository system and send the data to the C&C center's 330 Image Sending Monitoring Application 335. The C&C center 330 will monitor the Sweep metrics through the Image Send Monitoring Application's 335 dashboards. FIG. 8 illustrates the Sweep Dashboard 3000, which measures schedule deviation and duration of the process that sorts the pulled images from all sites into cash letters for delivery to a Send partner. The Sweep Dashboard 3000 has a zone for the Sweep Summary—Last Three Sweeps 3010 and a zone for the Sweep Exceptions 3020. The Sweep Summary—Last Three Sweeps zone 3010 lists; for the three most recent sweeps, the Sweep Start time 3011, the Entries 3012, the Items 3013, the Dollars 3014, and the Items per Minute 3015 associated with the three most recent sweeps. The Sweep Summary—Last Three Sweeps zone 3010 also has a row for the Sweep Detail (current day) 3016, which lists the same information that is listed for the three most recent sweeps, but totals the values for all of the Sweeps performed that day. The Sweep Exception zone 3020 has an Exceptions tab 3021, a Normal tab 3022, an Unscheduled tab 3023, and a Graph tab 3024. The Exceptions tab 3021 lists status indicators 3025 for each Scheduled Start 3028, an Endpoints drilldown button 3026, an Entries drilldown button 3027 the Actual Start time 3029, the Entries 3030, the Items 3031, the Dollars 3032, the Schedule Deviation 3034, the Duration 3036, and a Status column 3037. The Entries drilldown button 3027 displays what entries went into the sweep for the particular Scheduled Start time 3028, while the Endpoint drilldown 3026 displays what items were sorted to what endpoint for the particular Scheduled Start. The Normal tab 3022 lists all of the Sweeps that were delivered as scheduled, while the Unscheduled tab 3023 lists all of the Sweeps, which were classified as extra, which are sweeps that occurred before the Scheduled Start times 3028. The Graph tab 3024 displays the information in the Sweep Dashboard in graphical form. The metrics measured in the Sweep Dashboard 3000 relating to duration time are tracked because the duration information provides insight into how well the Sweep process 130 is performing. The metrics relating to the Schedule Deviations are tracked because the schedule deviation provides insight into the regularity and timeliness of the Sweep process 130. The throughput metrics are also measures used as an indicator of process health.

In one embodiment of the invention, the Distribution process 140 is next in the Image Send process 100, as illustrated by FIG. 2. The first step in the Distribution process 140 is to Build the ICL file, as represented by block 141. Building the ICL file includes merging in the appropriate Image files and the related MICR data. The ICL file created in this process includes the ICL and all of the check images that were eligible for the Image Send process. Then as represented by block 142, the remaining General Ledger ("GL") Entries are made based on the ICL and associated checks. After the GL Entries are made 142, the ICL file is sent to the appropriate partners based on the endpoint data in the ICL files, as represented by block 143. The images files may be sent manually or automatically, at a set time of the day, or after set durations have passed. In one embodiment of the invention, the files are distributed every 5 to 30 minutes. The last steps in the Distribution process 140 include receiving Acknowledgments from the Image Send partners receiving the ICL files, as represented in block 144, in order to confirm that these partners did in fact receive the ICL files. Each partner will respond with acknowledgment statements indicating they received the ICLs and have either accepted or rejected them.

Four CTQs may be measured during this process: the first being the Deviation from the Distribution Schedule 10; the second CTQ measured is the Distribution Duration 11. These and other metrics for this process may be measured and tracked in a Distribution Dashboard 4000, as illustrated in FIG. 9. The third and fourth metrics, which are measured in the Acknowledgment Dashboard 5000 as illustrated in FIG. 10, are the Timely Acknowledgment of sent ICLs from the partner within 90 minutes 12 and the Timely Negative Acknowledgment of the sent ICLs from the partner within 90 minutes 13. A timely acknowledgment of sent ICLs is an acknowledgment that the ICLs were received, and a negative acknowledgement is an acknowledgement returned stating that the ICLs have been rejected.

At this point in the process, the Business Activity Monitoring Application 327 will pull data related to the CTQs and other metrics for the Distribution process 140 from the send partners and the paying bank and send the data to the C&C center's 330 Image Sending Monitoring Application 335. The C&C center 330 will monitor the Distribution metrics through the Image Send Monitoring Application's 335 dashboards. FIG. 9 illustrates one embodiment of the Distribution Dashboard 4000, which measures schedule deviation, duration, and throughput of the actual delivery of the ICLs to the send partners. The Distribution Dashboard 4000 has a zone for the Distribution Summary of All Items Distributed 4010 and a zone for the Distribution Exception Detail 4020. The Distribution Summary of Items Distributed zone 4010 lists the Total Items 4011, the Total Dollars 4012, and the Average Items Per Minute 4013. The Distribution Exception Detail zone 4020 has an Exceptions tab 4021 and a Graph tab 4022. The Exception tab 4021 lists status indicators 4023 for each Scheduled Start 4024, the Items 4025, the Amount 4026, the Items per Minute 4027, and the Distributions Expected and Actual 4028. More detail relating to the specific Scheduled Starts 4024 in the Distribution Exception Detail zone 4020 can be examined by selecting a drilldown button 4030. The drilldown information lists for each Scheduled Start 4024, the Destination Routing number and Bank Name 4031, status indicators 4032, the Schedule Deviation 4033, the Duration 4035, the number of Items per Minute 4036, the Items 4037, and the Amount 4038. More detail about the files relating to the specific Destination Bank 4031 may be examined by selecting the drilldown button 4040. The metrics measured in the Distribution Dashboard 4000 relating to duration provide insight into how well the processes are performing. The metrics relating to schedule deviations are tracked because the schedule deviation provides insight into the regularity and timeliness of the Distribution process 140.

FIG. 10 illustrates one embodiment of the Acknowledgment Dashboard 5000, which monitors the presence and timing of the receipt of acknowledgements received from the partners, vendors, or the FED depending on the destination. The acknowledgments indicate that the ICLs have been received and are accepted or rejected by the send partners. The Acknowledgment Dashboard 5000 has an Acknowledgment Summary zone 5010 and an Acknowledgment Exception Detail zone 5020. The Acknowledgment Summary zone 5010 lists the Channel 5011 that ICLs are sent to, the number of ICLs Awaiting Acknowledgment 1 5012 (which is the acknowledgment from the partners that the ICLs were received), the number of ICLs Awaiting Acknowledgment 2 5012 (which is the acknowledgment back from the partners that the ICLs were accepted for processing and settlement), the number of Items 5014, and the number of Dollars 5015. The Acknowledgment Exception Detail 5020 has an Exceptions tab 5021, an Unmatched Acknowledgments tab 5022, and a Graph 5023. The Exceptions tab 5021 has status indicators 5024, and lists the Partner and Endpoint number 5025, the Channel 5026, the Time From Distribution 5028, the Acknowledgment Timestamp 5029 when the acknowledgment of receipt of the ICL was sent by the partner, the Acknowledgment 2 5031 time when a send partner acknowledged that the ICLs were accepted, the number of Items 5032 for the partner, and the Dollars 5033 for those Items 5032. The Unmatched acknowledgments tab 5022 shows the acknowledgements that were received, but cannot be matched with a sent ICL by routing number and dollar amount. The Graph tab 5023 displays the acknowledgment details in graphical form.

In one embodiment of the invention, the Settlement process 150 is next in the Image Send process 100. The first step in the Settlement process is to Create Carry Over Entries, as represented by block 151, which cannot be closed on the GL by the end of the day and thus, need to be completed on the following day. Then, as illustrated by block 152, End of Day Activities are completed, including creating all end of day reports. Next, the bank Receives the General Ledger Credits and Debits for the day from all the channels, as illustrated in block 153. Thereafter, the bank Balances the General Ledger, as illustrated in block 154.

In one embodiment of the invention, the Unsettled Item process 160 is the last process in the Image Send process 100. The first step in the Unsettled Item process 161 is to Identify the Unsettled Items not closed out, as represented by block 161. If the items are administrative returns, which are debits for unprocessable images from the send partner, the items are Booked to the Capture Site and processed as paper negotiable items at the sites, as represented by block 162. The rest of the process for these items is out of scope, as seen in the terminator 165. If the items are unsettled cash letters, the next step is to Research the Source of the unsettled cash letters and Resolve the unsettled items, as represented by blocks 163 and 164. Resolving the issues may include the C&C center monitoring team investigating the root cause or reaching the appropriate contacts to investigate the matter further.

The C&C Image Send 100 monitoring system may also include a summary dashboard that tracks a number of the important metrics that are measured throughout the Image Send process 100. FIG. 11 illustrates one embodiment of a Management Dashboard 400, which has four zones: the Health by Process Step—Current Day zone 410; the Throughput Tracking (Items/Minute) zone 420; the Duration Day zone 430; and the Alarms by Site zone 440. The Health by Process Step—Current Day zone 410 may display the dashboard 411, status indicators 412, Warning Events 413, Critical Events 415, the Yield 416 of the metrics in the dashboards 411, and the Items and dollar amount in Millions 417. The Throughput Tracking (Items/Minute) 420 displays the average throughput per minute of items sent through the sweep and distribution steps over the course of the day. The Management Dashboard's 400 Throughput Tracking 420 provides insight into how much volume the Image Send process 100 is processing and can be used as a performance indicator of the process. The Duration Day 430 zone displays the average duration times for the Pull, Sweep, Distribution, and Acknowledgment process steps over the course of the day. The Alarms by Site zone 440 lists each site involved in the process and the number of alarms associated with each site for the Capture, Capture Inventory, Pull, and Pull Inventory dashboards.

The C&C Image Send 100 process monitoring system may also contain a Research Repository dashboard 500. This dashboard gives users the capability at either an Entry or Endpoint level to optimize the Image Send process. If an end user wants to query the status of an entry exception presented on one of the dashboards, an Entry level search applies. If an end user wants to search for an endpoint for an ICL, he/she would execute an Endpoint level search to see ICL data relating to that endpoint throughout the Image Send process 100. The Research Repository Dashboard 500 allows a user to quickly track and troubleshoot entry and endpoint data located anywhere in the process. FIG. 12 illustrates one embodiment of the Research Repository Dashboard 500, which has an Entry Data tab 510 and an Endpoint Data tab 520. The tabs have selectable Criteria 512 and Group 513 information that allow a user of the Research Repository dashboard 500 to track and sort files in the Image Send process 100 by either the Entry Data number or the Endpoint number.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed, and that modifications and other embodiments and combinations of embodiments are intended to be included within the scope of the appended claims. Although specific terms are employed herein, they are used in a generic and descriptive sense only and not for purposes of limitation.

What is claimed is:

1. A system for monitoring an image send process wherein customers deposit within a financial institution a plurality of electronic or paper negotiable items, which are reformatted and sorted into image files for distribution to send partners or other financial institutions for ultimate delivery to a paying bank, the system comprising:

a computer-readable medium providing computer-readable instructions;

a display device; and a processor operatively coupled to the display device and the computer-readable medium, wherein the processor is configured to execute the computer-readable instructions to:

monitor a capture step related to capturing the negotiable items at processing sites, automated teller machines (ATMs), or cash recyclers by tracking a capture metric related to an image quality of the negotiable items or a completeness of the negotiable items during the capture step;

monitor a pull step related to pulling the negotiable items into a central repository by tracking a pull metric related to the image quality of the negotiable items or the completeness of the negotiable items during the pull step;

monitor a sweep step related to sweeping the negotiable items from the central repository for distribution by tracking a sweep metric related to the image quality of the negotiable items or the completeness of the negotiable items during the sweep step;

monitor a distribution step related creating image cash letters (ICLs) from the negotiable items and sending the ICLs by tracking a distribution metric related to the image quality of the negotiable items in the ICLs or the completeness of the negotiable items in the ICLs during the distribution step;

monitor an acknowledgement step related to determining if the ICLs were received by tracking an acknowledgement metric related to the image quality of the negotiable items in the ICLs or the completeness of the negotiable items in the ICLs during the acknowledgement step;

compare the capture metric, the pull metric, the sweep metric, the distribution metric, and the acknowledgement metric to thresholds; and use the display device to display information about the capture metric, the pull metric, the sweep metric, the distribution metric, and the acknowledgement metric with respect to the thresholds related to the negotiable items within the image send process in a dashboard.

2. The system of claim 1, wherein the processor configured to execute the computer-readable instructions to display the metrics related to the completeness or the image quality of the negotiable items comprises displaying metrics for at least one of a type of image, a dollar amount associated with the image, a quality of the image and the completeness of magnetic ink character recognition information.

3. The system of claim 1, wherein the processor is further configured to execute computer-readable instructions to signal a warning through a status indicator in the dashboard when at least one of the metrics are outside the thresholds.

4. The system of claim 1, wherein the processor configured to execute the computer-readable instructions to display the metrics comprises displaying the metrics in real-time or near-real-time.

5. The system of claim 1, wherein the processor is further configured to execute computer-readable instructions to receive a selection from a user to access one or more other dashboards that provide information specifically about one or more steps in the image send process; and display the one or more dashboards to the user.

6. The system of claim 1 wherein displaying the metrics related to the image send process in a dashboard comprises displaying at least one of a type of a ratio of acceptable images to those needing to be processed as paper, an inventory of items and amounts captured as images and as paper, a deviation in a time schedule of a step in the image send process, a duration of an event within each step in the image send process, a time measurement between events in each step in the image send process, and an acknowledgment from image send partners within a specified time period.

7. A method for monitoring an image send process, comprising:

monitoring, by a processor, a capture step related to capturing images of the negotiable items at processing sites, automated teller machines (ATMs), or cash recyclers by tracking a capture metric related to an image quality of the negotiable items or a completeness of the negotiable items during the capture step;

monitoring, by the processor, a pull step related to pulling the negotiable items into a central repository by tracking a pull metric related to the image quality of the negotiable items or the completeness of the negotiable items during the pull step;

monitoring, by the processor, a sweep step related to sweeping the negotiable items from the central repository for distribution by tracking a sweep metric related to the image quality of the negotiable items or the completeness of the negotiable items during the sweep step;

monitoring, by the processor, a distribution step related creating image cash letters (ICLs) from the negotiable items and sending the ICLs by tracking a distribution metric related to the image quality of the negotiable items in the ICLs or the completeness of the negotiable items in the ICLs during the distribution step;

monitoring, by the processor, an acknowledgement step related to determining if the ICLs were received by tracking an acknowledgement metric related to the image quality of the negotiable items in the ICLs or the completeness of the negotiable items in the ICLs during the acknowledgement step;

comparing, by the processor, the capture metric, the pull metric, the sweep metric, the distribution metric, and the acknowledgement metric to thresholds; and displaying, by the processor and a display device, information about the capture metric, the pull metric, the sweep metric, the distribution metric, and the acknowledgement metric with respect to the thresholds related to the negotiable items within the image send process in a dashboard.

8. The method of claim 7, wherein the pull step comprises:
reformatting the images into a format that is compatible with downstream applications.

9. The method of claim 7, wherein the distribution step comprises:

assigning the at least one image a classification that is based on at least one of a destination routing and transit number, the capture site, a float variable, a day of the week, a time of the day, or an exclusion; and distributing the at least one image to an image send partner based at least partially on the classification.

10. The method of claim 9, wherein the distribution step further comprises:
sorting the image into batches based on the classification.

11. The method of claim 7, wherein the distribution step further comprises:
grouping the images into image cash letter files for distribution to the at least one image send partner.

12. The method of claim 7, wherein displaying the metrics in the dashboard comprises displaying a plurality of selectable customized dashboards that display the metrics in numerical or graphical form.

13. The method of claim 12, further comprising:
receiving a selection of a selectable feature related to the at least one metric within the selectable customized dashboards; and displaying drilled down information relating to the at least one metric.

14. The method of claim 7, wherein the method further comprises:
monitoring the metrics on the monitoring system over a period of time.

15. The method of claim 7, wherein the capture step comprises:
performing an image quality analysis on the at least one image.

16. The method of claim 15, wherein performing an image quality analysis on the image further comprises:
repairing the image if the image fails the image quality analysis.

17. The method of claim 7, wherein displaying information about the metrics related to the completeness and the image quality of the negotiable items in the image send process comprises displaying metrics for at least one of a type of image, a dollar amount associated with the image, a quality of the image and the completeness of magnetic ink character recognition information.

18. The method of claim 7, further comprising:
displaying through a status indicator in the dashboard when the at least one of the metrics is within or outside of the threshold in real-time or near-real-time.

19. The method of claim 7 further comprising:
displaying a status indicator in the dashboard when the at least one metric is within or outside of the threshold.

20. The method of claim 7 wherein displaying the metrics related to the capture step comprises displaying at least one of a type of a ratio of acceptable images to those needing to be processed as paper and an inventory of items and amounts captured as images and as paper.

21. The method of claim 7 wherein displaying the metrics related to the receiving step comprises displaying at least one of a type of a deviation in a time schedule for the receiving step, a duration of an event in the receiving step and a time measurement between an event in the receiving step and the next event.

22. The method of claim 7 wherein displaying the metrics related to the distributing step comprises displaying at least one of a type of a deviation in a time schedule for the distributing step, a duration of an event in the distributing step, a time measurement between an event in the distributing step and the next event, and an acknowledgement from image send partners within a specified time period.

23. A non-transitory computer-readable medium having computer-readable program code portions embodied therein, the computer-readable program code portions being executed by a computer, the computer-readable program code portions comprising:
an executable portion configured for monitoring a capture step related to capturing images of the negotiable items at processing sites, automated teller machines (ATMs), or cash recyclers by tracking a capture metric related to an image quality of the negotiable items or a completeness of the negotiable items during the capture step;
an executable portion configured for monitoring a pull step related to pulling the negotiable items into a central repository by tracking a pull metric related to the image quality of the negotiable items or the completeness of the negotiable items during the pull step;
an executable portion configured for monitoring a sweep step related to sweeping the negotiable items from the central repository for distribution by tracking a sweep metric related to the image quality of the negotiable items or the completeness of the negotiable items during the sweep step;
an executable portion configured for monitoring a distribution step related creating image cash letters (ICLs) from the negotiable items and sending the ICLs by tracking a distribution metric related to the image quality of the negotiable items in the ICLs or the completeness of the negotiable items in the ICLs during the distribution step;
an executable portion configured for monitoring an acknowledgement step related to determining if the ICLs were received by tracking an acknowledgement metric related to the image quality of the negotiable items in the ICLs or the completeness of the negotiable items in the ICLs during the acknowledgement step;
an executable portion configured for comparing the capture metric, the pull metric, the sweep metric, the distribution metric, and the acknowledgement metric to thresholds; and
an executable portion configured for displaying on a display device, information about the capture metric, the pull metric, the sweep metric, the distribution metric, and the acknowledgement metric with respect to the thresholds related to the negotiable items within the image send process in a dashboard.

24. The non-transitory computer-readable medium of claim 23, wherein the executable portion configured for displaying the dashboard is further configured to receive a selection from the user to drill down to one or more other dashboards that provide information specifically about one or more steps of the image send process; and display the one or more other dashboards to the user.

25. The non-transitory computer-readable medium of claim 23, wherein the executable portion configured for displaying, on the display device, information about the metrics further comprises displaying the one or more metrics related to at least one of a type of image, a quality of the image and the completeness of magnetic ink character recognition information.

26. The non-transitory computer-readable medium of claim 23, wherein the computer-readable program code portions further comprise:
an executable portion configured to signal a warning through a status indicator when the at least one metric is outside the threshold or violates the rule.

27. The non-transitory computer-readable medium of claim 23, wherein the executable portion configured for displaying the metrics in the dashboard comprising displaying the metrics in real-time or near-real-time.

28. The non-transitory computer-readable medium of claim 23, wherein the computer-readable program code portions further comprise:
an executable portion to receive a selection from the user to customize the one or more dashboards and specify which one or more metrics are to be displayed on the one or more dashboards.

29. The non-transitory computer-readable medium of claim 23 wherein the executable portion configured for displaying the metrics related to the image send process comprises displaying at least one of a type of a ratio of acceptable images to those needing to be processed as paper, an inventory of items and amounts captured as images and as paper, a deviation in a time schedule of a step in the image send process, a duration of an event within each step in the image send process, a time measurement between events in each step in the image send process, and an acknowledgment from image send partners within a specified time period.

* * * * *